US008578426B2

(12) United States Patent
Tiongson et al.

(10) Patent No.: US 8,578,426 B2
(45) Date of Patent: Nov. 5, 2013

(54) METHOD AND SYSTEM FOR SELECTING MEDIA CONTENT FOR BROADCAST BASED ON VIEWER PREFERENCE INDICATIONS

(75) Inventors: Ed O. Tiongson, Escondido, CA (US); George Joseph, San Diego, CA (US); Walker Curtis, San Diego, CA (US); Eitan Pilipski, San Diego, CA (US); Anthony G. Persaud, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 341 days.

(21) Appl. No.: 12/556,466

(22) Filed: Sep. 9, 2009

(65) Prior Publication Data
US 2010/0064306 A1  Mar. 11, 2010

Related U.S. Application Data

(60) Provisional application No. 61/236,805, filed on Aug. 25, 2009, provisional application No. 61/095,931, filed on Sep. 10, 2008.

(51) Int. Cl.
*H04N 7/16* (2011.01)
*H04N 7/173* (2011.01)
*H04N 5/445* (2011.01)
*G06F 3/00* (2006.01)
*G06F 3/048* (2013.01)
*G06Q 30/00* (2012.01)

(52) U.S. Cl.
USPC .................. 725/62; 725/24; 725/40; 725/43; 725/45; 348/563; 348/564; 715/790; 715/791; 715/796; 705/14.44

(58) Field of Classification Search
USPC ............ 725/24, 40, 43, 45, 62; 348/563, 564; 715/790, 791, 796; 705/14.44
See application file for complete search history.

(56) References Cited

U.S. PATENT DOCUMENTS 5,758,257 A    5/1998  Herz et al.
7,131,003 B2  10/2006  Lord et al.

(Continued)

FOREIGN PATENT DOCUMENTS

CN    101138242 A    3/2008
EP      0776132        5/1997

(Continued)

OTHER PUBLICATIONS

International Search Report, PCT/US2009/056450, International Searching Authority, European Patent Office, Dec. 23, 2009.

(Continued)

*Primary Examiner* — Hoang-Vu A Nguyen-Ba
(74) *Attorney, Agent, or Firm* — The Marbury Law Group, PLLC

(57) ABSTRACT

Methods and systems enable mobile TV providers to select programs for broadcast based on viewer preference indications or votes. Information regarding candidate programs or content may be broadcast and displayed on mobile devices. A voting user interface may receive viewer preferences or votes and transmit vote information to the mobile TV broadcast network using a unicast network. Received voting information may be tallied to select a program or content for broadcast. Interim vote tallies may be broadcast to mobile devices until a voting session is terminated. Results of the voting session may be broadcasted followed by broadcast of the selected program.

33 Claims, 18 Drawing Sheets

(56) References Cited

U.S. PATENT DOCUMENTS

| | | |
|---|---|---|
| 7,162,433 B1 | 1/2007 | Foroutan |
| 7,958,010 B2 | 6/2011 | Huang |
| 8,014,763 B2 | 9/2011 | Hymes |
| 2002/0026496 A1 | 2/2002 | Boyer et al. |
| 2002/0194607 A1 | 12/2002 | Connelly |
| 2003/0078972 A1 | 4/2003 | Tapissier et al. |
| 2003/0122966 A1 | 7/2003 | Markman et al. |
| 2003/0135605 A1 | 7/2003 | Pendakur |
| 2004/0163127 A1 | 8/2004 | Karaoguz et al. |
| 2005/0054286 A1* | 3/2005 | Kanjilal et al. ............ 455/3.05 |
| 2005/0108770 A1 | 5/2005 | Karaoguz et al. |
| 2006/0015908 A1 | 1/2006 | Vermola et al. |
| 2006/0101492 A1 | 5/2006 | Lowcock |
| 2006/0156330 A1 | 7/2006 | Chiu |
| 2006/0174277 A1 | 8/2006 | Sezan et al. |
| 2006/0259469 A1 | 11/2006 | Chiu |
| 2007/0050820 A1 | 3/2007 | Saarikivi et al. |
| 2007/0186230 A1* | 8/2007 | Foroutan ........................ 725/24 |
| 2007/0213004 A1 | 9/2007 | DaCosta |
| 2007/0276917 A1 | 11/2007 | Sandegard et al. |
| 2007/0288970 A1 | 12/2007 | Tedenvall |
| 2008/0002021 A1 | 1/2008 | Guo et al. |
| 2008/0061142 A1* | 3/2008 | Howcroft et al. ............ 235/386 |
| 2008/0092203 A1 | 4/2008 | Bouazizi et al. ............ 725/135 |
| 2008/0104624 A1 | 5/2008 | Narasimhan et al. |
| 2008/0115178 A1* | 5/2008 | Godin ............................ 725/97 |
| 2008/0168506 A1 | 7/2008 | Pickelsimer |
| 2009/0015660 A1 | 1/2009 | Vedantham et al. |
| 2009/0158337 A1* | 6/2009 | Stiers et al. ..................... 725/44 |
| 2009/0172723 A1 | 7/2009 | Shkedi et al. |
| 2009/0228911 A1* | 9/2009 | Vrijsen ............................ 725/14 |
| 2009/0328101 A1* | 12/2009 | Suomela et al. ................ 725/40 |
| 2010/0029302 A1 | 2/2010 | Lee et al. |
| 2010/0064307 A1 | 3/2010 | Malhotra et al. |
| 2010/0146559 A1 | 6/2010 | Lee et al. |
| 2010/0192179 A1* | 7/2010 | Ellis et al. ........................ 725/40 |
| 2010/0199340 A1 | 8/2010 | Jonas et al. |
| 2011/0214148 A1 | 9/2011 | Gossweiler, III et al. |

FOREIGN PATENT DOCUMENTS

| | | |
|---|---|---|
| EP | 1443765 A2 | 8/2004 |
| EP | 1936986 A2 | 6/2008 |
| EP | 1954051 A1 | 8/2008 |
| GB | 506692 | 5/2005 |
| KR | 20050016685 A | 2/2005 |
| KR | 20050059355 A | 6/2005 |
| KR | 20050087997 A | 9/2005 |
| KR | 20080049868 A | 6/2008 |
| WO | WO02069636 | 9/2002 |
| WO | 03034735 | 4/2003 |
| WO | WO03088666 | 10/2003 |
| WO | WO2004004383 A1 | 1/2004 |
| WO | WO2004036912 | 4/2004 |
| WO | WO2006072117 A1 | 7/2006 |
| WO | WO2007131525 A1 | 11/2007 |
| WO | 2008030298 | 3/2008 |

OTHER PUBLICATIONS

Written Opinion, PCT/US2009/056450, International Searching Authority, European Patent Office, Dec. 23, 2009.

"Tispan; NGN; NGN generic capabilities and their use to develop services; Draft ETSI TR 1XX XXX" ETSI Standards, LIS, Sophia Antipolis Cedex, France, No. VO.2.0, Oct. 1, 2005, XP014031601 ISSN: 0000-0001 paragraph [7.4.1.5.4.2].

Abreu J et al: "2Be0n: Interactive television supporting interpersonal communication" Proceedings of the Eurographics Workshop on Multimedia, XX, XX, Jan. 1, 2002, pp. 199-208, XP002278091 the whole document.

International Preliminary Report on Patentability—PCT/US2009/056453, The international Bureau of WIPO—Geneva, Switzerland, Jan. 11, 2011.

\* cited by examiner

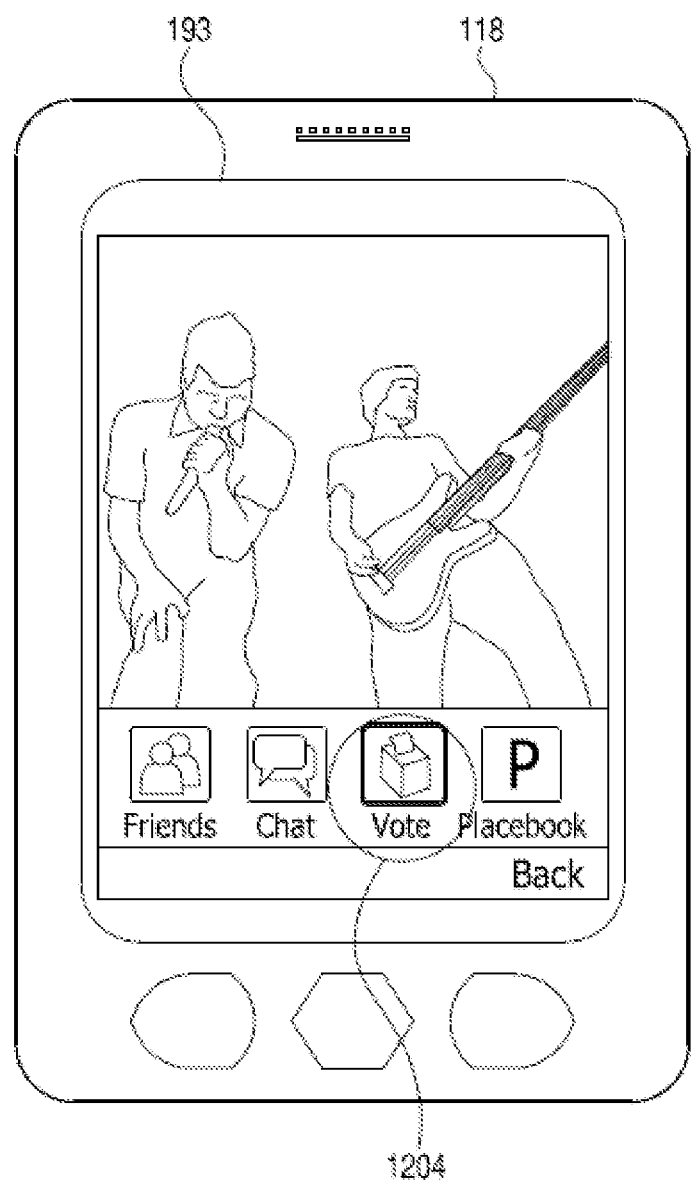

METHOD AND SYSTEM FOR SELECTING MEDIA CONTENT FOR BROADCAST BASED ON VIEWER PREFERENCE INDICATIONS

RELATED APPLICATIONS

This invention claims the benefit of priority to U.S. Provisional Patent Application Nos. 61/095,931 which was filed on Sep. 10, 2008, and 61/236,805 which was filed on Aug. 25, 2009, the entire contents of which are hereby incorporated by reference.

BACKGROUND

Wireless communication technologies have seen explosive growth over the past few years. This growth has been fueled by wireless services providing freedom of movement to the mobile public and cutting the tether to hard wire communication systems. Increasing quality and speed of voice and data communications over the wireless medium has attracted additional users. As a result of these service enhancements, the popularity of wireless services is expected to continue to grow rapidly.

A recent addition to wireless communication technologies has been the growth of mobile television broadcast systems. Mobile broadcast users can view mobile editions of news, entertainment, sports, business, and other programming using their cell phone or other wireless mobile devices. These broadcast systems have seen significant increase in usage and availability worldwide. Currently, media broadcasts to mobile devices depend on pre-set program scheduling set by the mobile TV broadcast network providers, or are based on requests received from individual users for specific contents.

SUMMARY

The various embodiments provide methods and systems for broadcasting mobile TV programs to mobile devices based on viewer preferences or votes. In an embodiment, a voting overlay content may be broadcast to mobile devices for use in generating a display of candidate programs or content that may be broadcasted. Viewers may enter their preferences or vote for particular programs or content on their mobile devices, which transmit their preference indications or votes to the mobile TV broadcast network. Viewer preference indications or votes may be tallied by a server to select most popular programs or content for broadcast by the mobile TV broadcast network. In an embodiment, viewer preference indications or votes cast may be received and tallied by a voting server, with running totals broadcast to mobile devices for display to viewers. Viewers may then vote or change their votes during the vote-casting period based upon the running vote tallies to further influence the broadcast content selection.

In an embodiment, viewer preference indications or votes may be accepted until voting is terminated and at which time a most popular program or content may be selected for broadcast. The selected program or content may then be scheduled for broadcast over the mobile TV broadcast network, and an announcement or updated electronic service guide broadcast to mobile devices announcing the selected program or content to viewers before the selected program broadcast begins. This announcement may be broadcast by updating the voting overlay content that is broadcasted to mobile devices to include the selected program or content announcement.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

FIGS. 12A-12E are elevation views of a mobile device illustrating an example user interface according to an embodiment.

DETAILED DESCRIPTION

Figure 1:
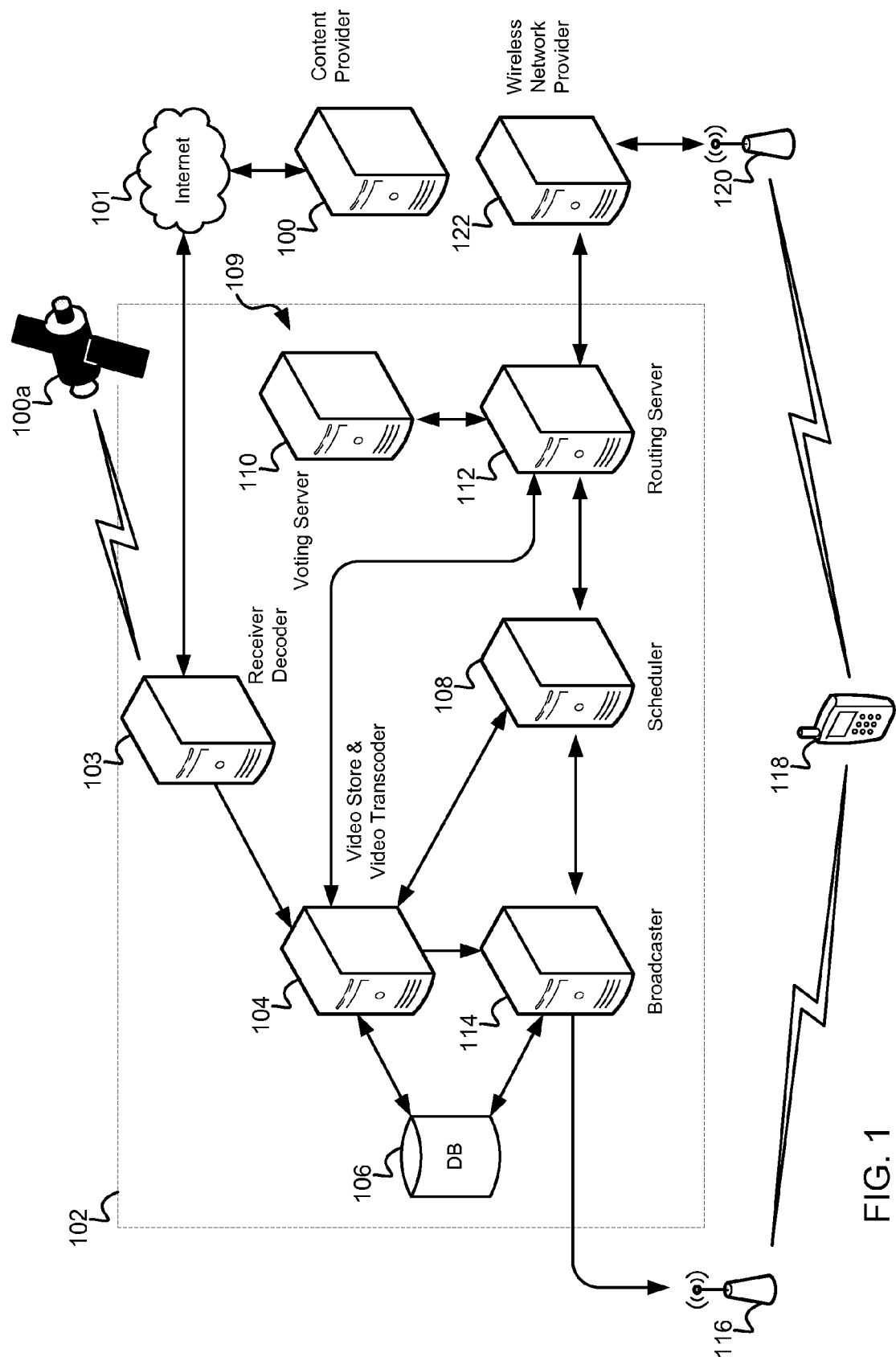
FIG. 1 is a communication network component diagram illustrating different components of a mobile TV broadcast system according to the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device" and "handheld device" refer to any one or all of cellular telephones, personal data assistants (PDA's), personal televisions (PTV's), personal media players (PMP's), palm-top computers, wireless electronic mail receivers (e.g., the Blackberry® and Treo® devices), multimedia Internet enabled cellular telephones (e.g., the Blackberry Storm®), Global Positioning System (GPS) receivers, wireless gaming controllers, and similar personal electronic devices which include a programmable processor and memory and receiver circuitry for receiving and processing mobile broadcast television services.

The word "unicast" is used herein to mean the transmission of data (information packets) to a single destination.

Examples of unicast transmissions include SMS, MMS and electronic mail messages. The word "broadcast" is used herein to mean the transmission of data (information packets) so that it can be received by a large number of receiving devices. Examples of a broadcast message are mobile television (TV) broadcast service transmissions.

The term "content providers" is used herein to refer to entities which provide video, website and other data that is broadcast over a mobile television system. The term "mobile TV broadcast network providers" is used herein to refer to those entities which broadcast mobile television signals. Typically, mobile TV broadcast network providers receive broadcast content from the content providers.

Mobile TV services are growing in popularity in part because mobile devices provide a unique platform for receiving TV programs, and because the bandwidth available in mobile TV broadcast networks can deliver a large amount of content to mobile devices in an efficient manner. One unique aspect of a mobile device is that each user typically owns his/her device and does not have to share it with others. Thus, mobile device owners can watch the mobile TV programs they choose without having to compete for the TV remote control or negotiate for TV programs that they prefer to watch. While there is autonomy in viewing mobile TV programs, viewers still have no control over the content that is broadcast over the mobile TV networks. Even pay-per-view services offered by mobile TV broadcast network providers do not allow users to select the programs that will be aired. With pay-per-view, for example, viewers may elect to pay only for a pre-set program that will be broadcast at a certain time. Currently, the mobile TV broadcast network providers dictate the programs that are broadcast and the times they are aired. Thus, viewers of mobile TV broadcast services have little say in the programs broadcasted or program scheduling, at least not in near real-time The various embodiment methods and systems enable viewers to provide input regarding programs or content broadcast over a mobile TV broadcast network. The embodiments enable mobile TV broadcast networks to provide viewers with a list of candidate programs or content and allow them to indicate a preference or vote for the program or content they would like to view. Viewer preferences or votes may be received and tallied to popularly select one program, multiple programs or content for broadcast.

Information regarding candidate programs or content (i.e., programs or content for which viewers may express a preference or vote) may be broadcast over a mobile TV broadcast network, such as in an overhead channel or overhead data flow within the mobile TV broadcast transmissions. For ease of reference, the term "voting overlay content" is used herein to refer to information regarding candidate programs or content, time frames for viewer voting, preliminary vote tallies, selected programs or content, and other information related to the vote casting process that are broadcast by the mobile TV broadcast network in the various embodiments. Mobile devices may receive this voting overlay content information and generate a display of candidate programs or content, along with a user interface to enable viewers to indicate their preference or vote. Viewer preference indications or votes may be transmitted to the mobile TV broadcast network via a unicast network, such as a cellular data communication network. A client application may be implemented on mobile devices to receive the voting overlay content and display the list of candidate programs along with voting tallies, as well as to receive, process and transmit viewer preference or voting selections.

The vote casting process may be managed by a voting server within the mobile TV broadcast network system. Such a voting server may generate the voting overlay content, and receive and tally viewer preference indications or votes. Viewers may be given a limited period of time for casting votes, at the conclusion of which a most popular program or content will be selected for broadcast by the voting server. The voting server may periodically tally viewer preference indications or votes and transmit updated vote tally information to mobile devices in the overhead portion of broadcast transmissions for display to viewers during the vote casting period. When the vote casting period ends, the voting server may tally the viewer preference indications or votes, determine a selected program or content based on the vote tallies, schedule the selected program or programs for broadcast, generate for broadcast an announcement of the selected program or content, and cause the selected program or content to be broadcasted at its scheduled time.

When one vote casting period ends, the process may be repeated by the mobile TV broadcast network by broadcasting a new list of candidate programs or content for which viewers may indicate their preference or vote. In this manner, viewer preferences or votes can be taken into account in determining the content that will be broadcast over a mobile TV broadcast network. By allowing viewers to vote for their preferred programs and thus influence the programming schedule in near real-time, mobile TV broadcast network providers may create a sense of community among their subscribers and add a sense of participation and competition to the mobile TV viewing experience.

Operation of the various embodiments may be explained by means of an illustrative example. A music video channel carried by a mobile TV broadcast network may broadcast to viewers a list of candidate music videos on which viewers may vote to indicate a music video they would like to watch next. Viewers may view the list of candidate videos on their mobile device displays and, during a vote casting period, make a selection on their mobile device to vote for the next music video to be broadcast. The mobile devices process viewer selections and send messages conveying their votes to the mobile TV broadcast network via a unicast network, such as a cellular data communication network. As the mobile TV broadcast network receives and tallies viewer votes, a running vote tally may be broadcast so that viewers can see which of the various candidates are receiving the most votes. Viewers may continue to vote, including switching their votes to a preferred one of a few videos receiving the most votes, in order to further influence the selection. When the vote casting period ends, the mobile TV broadcast network may transmit an announcement, such as an updated program guide, indicating the next music video to be broadcast, and broadcast another list of candidate music videos on which viewers may vote. Then at the designated time, the viewer-selected music video is broadcast on the mobile TV broadcast network.

Different voting methods may be implemented to allow viewers to participate in broadcast program selections. In one method, viewers may vote only one time during a voting session. In a second method, viewers may vote for a program or content multiple times during the vote-casting period, including changing their votes. In a third method, viewers may vote once within a first time frame, after which the voting server may tally votes, delete the least popular programs or content from the candidate list, and initiate a second voting time frame to allow viewers to vote on a "run off" list of candidate programs or content. Other voting strategies may also be implemented.

The various embodiments may be extended to enable viewers to participate in determining other aspects of the broadcast program, such as general program content, timing of broadcast programs, and program broadcast recurrence. For example, viewers may be allowed to vote for the general content of broadcast programs, such as voting to select a certain genre of music that may be played on a music broadcast channel. Viewers may also be allowed to vote for broadcast time frames for programs that may be broadcast, such as particular weekend days. The vote casting methods adopted by the mobile TV broadcast network providers may include many different methods and may be arbitrary, based on the sale and marketing goals of the mobile TV broadcast network providers, or on user viewing behavior.

The system components of the various embodiments may be owned and managed by one entity, such as a mobile TV broadcast network provider. Alternatively, several entities may cooperate to create a desired system which allows users to vote on broadcast programs and view the resulting broadcast programs. When multiple entities contribute components to the system of the various embodiments, content providers, mobile TV broadcast network providers, wireless service providers and mobile device users may interact and contract with one another to provide the service.

A number of different mobile TV broadcast services and broadcast standards are available or contemplated in the future, all of which may implement and benefit from the various embodiments. Such services and standards include Open Mobile Alliance Mobile Broadcast Services Enabler Suite (OMA BCAST), MediaFLO, Digital Video Broadcast IP Datacasting (DVB-IPDC), and China Multimedia Mobile Broadcasting (CMMB). Typically, mobile broadcast program transmission are encrypted so that the access to programming can be sold on a subscription or on a pay-per-view basis, while a service guide is broadcast unencrypted to enable receiver devices to present users with a listing of available programs. Examples of wireless network providers may include, Verizon®, Sprint® and Cingular®.

In a system in which multiple entities contribute to providing mobile TV service to customers, a mobile TV broadcast network provider may receive program and content from one or more content providers, and convert the received content to a format compatible with the mobile TV broadcast network. A mobile TV broadcast network provider may also need to contract with a wireless network provider to obtain the services of a unicast network through which mobile device users can communicate their preference indications or votes to the mobile TV broadcast network provider. For example, mobile device users may transmit their votes for preferred broadcast programming to the mobile TV broadcast network provider using a cellular data communication network.

FIG. 1 illustrates an overview of the network components in a mobile TV broadcast system enabling mobile device users to vote for broadcast programming. As shown in FIG. 1, content or programs may be sent to the mobile TV broadcast network provider 102 from one or more content providers 100. The content provider 100 may use different methods to send content to the mobile TV broadcast network provider. For example, the content provider 100 may send content to the mobile TV broadcast network provider 102 via the Internet 101 or a satellite communication link 100a.

The mobile TV broadcast network provider 102 may include a variety of components by which it can receive, process and broadcast content from a content provider 100. For example, the broadcast provider 102 may receive content via a decoder 103 which receives content feeds and converts (e.g., decrypts) such feeds into a format compatible with the rest of the system. Live content and non-real-time content video feeds may be sent to a transcoder 104 for transcoding. The transcoder 104 may extract the core video from the decrypted feed, prepare the video for transcoding, perform functions such as de-interlacing, downsize each video channel to an appropriate format, such as QVGA format, and recompressing the content using, for example, the AVC/H-264 standard. Such transcoding enables high quality video to be produced at low bit rates. The resulting video stream may then be encrypted and sent to the broadcaster 114 for multiplexing into broadcast transmissions that are broadcast by broadcast sites 116. The transcoder 104 may also be configured to store transcoded video streams or to send the transcoded video streams to a content database 106 for storage so that the video streams can be broadcast at a later time. The storage of videos, programs and other content in a content database 106 also enables the mobile TV broadcast network to offer programming that continuously changes depending on viewer votes as described herein.

The broadcaster 114 may combine multiple video channels and overhead data, such as the programming guide information, into the broadcast transmission signals which are forwarded to transmitter sites 116 for broadcast, such as via cables, satellite data links, microwave data links, or optical fiber data networks. The multiplexed content is broadcasted to mobile devices 118 from the transmitter sites 116.

In the various embodiments, the mobile TV broadcast network provider 102 may include a voting unit 109, which may include a voting server 110 configured to process and manage the view voting process, and a router 112 configured to receive viewer vote messages from a unicast network (e.g., a wireless network provider 122) and route such messages to the voting server 110. The voting unit 109 may allow the mobile TV broadcast network provider to incorporate voting processes into the broadcast system, process votes received, broadcast voting results to viewers, and enable broadcast programs to be selected based on viewer participation.

The voting server 110 may be configured by software instructions to manage the overall voting process. Such voting process functionality may include generating the voting overlay content for broadcast to mobile devices which indicates candidate programs for which viewers can cast votes, receiving and tallying viewer preference indications or votes, and coordinating with other components within the mobile TV broadcast network system to broadcast content consistent with voting results. The voting overlay content may be transmitted to mobile devices 118 as an overhead content within broadcast transmissions generated by the broadcaster 114.

Information within the voting overlay content may be received and processed by a client application operating within the mobile devices 118 to generate a display and user interface that lists candidate programs or content and allows viewers to cast votes for their preferences. Thus, mobile devices 118 that are configured with such a client application may receive and process the voting overlay content, and generate a display based on the information contained in the voting overlay content. The client application may further accept and interpret viewer voting actions, which may be received in the form of button presses or touches on a touch-sensitive display, and communicate their votes to the mobile TV broadcast network provider 102 via a wireless data communication network 122.

To generate the voting overlay content, the voting server 110 may receive information from different components of the network as illustrated in FIG. 1. For example, the voting server 110 may be configured by software instructions to receive information about content available for broadcast from the transcoder 104, content database 106, scheduler server 108, or other component. Such information about the content, which may be referred to as "content metadata," may include information such as a title, subject matter, creation or program date, run time, genre, parental rating, critic rating (e.g., "four stars"), and other information that may be useful to viewers voting on content for broadcast. The content metadata received by the voting server 110 may be processed and organized into a list of candidate programs or content and incorporated into a voting overlay content which can be broadcast via an overhead portion of the broadcast transmissions. Again, the voting overlay content may be received by mobile devices 118 and processed by a client application to generate an overlay display/user interface that enables viewers to cast their votes for different programs. For example, the voting server 110 may receive a list of candidate programs from the content provider transcoder 104, content database 106, or scheduler server 108, and generate voting overlay content which is sent to the broadcaster 114 for broadcast to mobile devices 118. In an alternative example, the voting server 110 may generate a list of candidate programs based on content metadata received from the transcoder 104, content database 106, or scheduler server 108, and generate the voting overlay content which is sent to the broadcaster 114 for broadcast.

The voting server 110 may also be configured by software instructions to receive and tally votes cast by viewers. When users indicate a preference or cast a vote on their mobile devices 118 for particular candidate programs or content, the voting data may be sent from the mobile devices 118 to the mobile TV broadcast network provider 102 using a unicast network, such as a wireless data network 122 (e.g., cellular data communication network or WiFi network), which includes a plurality of wireless access nodes 120. The wireless network provider 122 conveys the voting data message to the mobile TV broadcast network provider 102 as a data call or as an addressed message, such as e-mail, Short Message Service (SMS), or similar type message. The voting data message may be received by a server or router 112, which can route the message to the voting server 110 for processing.

The voting server 110 may also be configured by software instructions to periodically generate new or updated voting overlay content messages for broadcast to mobile devices 118 that provide interim vote tally results. If voting is in progress, the voting server 110 may receive votes cast by viewers, calculate a running tally for each candidate program or content and incorporate the results into the voting overlay content that is broadcast to mobile devices 118. Mobile devices 118 may be configured with a client application to receive the updated voting overlay content and generate a display of the running vote tallies. Thus, viewers may react to voting trends such as by switching their votes from a less popular program or content to one of the more popular programs or content in order to further influence the selection process.

The voting server 110 may also be configured by software instructions to limit or vary the time period during which the viewers can cast their votes for a given program or content. For example, in an embodiment the time period during which viewers can cast votes may begin when a previously selected broadcast program begins, and may end a few seconds before that program ends. As described above, during this vote casting time period, the voting server 110 may receive and tally votes, and update voting overlay content that is broadcast by the mobile TV broadcast network 102. When the voting time period ends, the voting server 110 may stop receiving new votes, tally all the received votes, and generate a voting overlay content message announcing the selected program or content that will broadcast. The voting server 110 may also include the final voting results (e.g., vote percentages received for each program or content) in the voting overlay content. As with other voting overlay content messages, the announcement of the selected program or content and any voting results are broadcast in an overhead portion of the broadcast transmissions.

The voting server 110 may also be configured by software instructions to direct or initiate the process by which a selected program or content is scheduled for broadcast. For example, the voting server 110 may inform the scheduler server 108 of a selected program or content, so that the scheduler server 108 can direct the broadcaster 114 to obtain and broadcast the selected program. The voting server 110 may identify a file name or other locator for the selected program or content to enable the scheduler server 108 or broadcaster 114 to obtain the program or content from memory, such as from a content database 106. The voting server 110 may also provide additional content metadata to the scheduler server 108 to enable it to determine a proper broadcast time and include the broadcast duration in an updated program guide message. This content metadata may also be used by other components of the mobile TV broadcast network provider 102, such as the transcoder 104, content database 106, or broadcaster 114, to enable the mobile TV broadcast network provider 102 to retrieve the program from the storage and insert it in the broadcast stream on the correct content flow ID and at the appropriate time.

In providing the voting process functionality, the voting server 110 may coordinate with other components of the mobile TV broadcast network provider 102 in a variety of ways. For example, the voting server 110 may send voting overlay contents to the transcoder 104 for transcoding into a signal format that the broadcaster 114 can broadcast to mobile devices 118. To indicate a selected program or content for broadcast, the voting server 110 may send a file name or other locator for the selected program or content to the transcoder 104 to enable the transcoder 104 to retrieve the selected program or content from internal memory (i.e., video storage within the transcoder 104) or external storage (e.g., a content database 106). The transcoder 104 may then obtain and transmit the video to the broadcaster 114 to be sent to the viewers' mobile devices 118. Alternatively, the voting server 110 may coordinate directly with the broadcaster 114, such as by providing the voting overlay content for inclusion in the overhead portions of broadcast transmission, and by providing the broadcaster 114 with the selected program or content address so the broadcaster 114 can obtain the content from a content database 106 for insertion into the broadcast signal.

The voting server 110 may be configured by software instructions to perform scheduling functions autonomously, to coordinate scheduling with the scheduler server 108, or to leave selected program or content scheduling to the scheduler server 108. For example, the voting server may send the voting overlay content to the scheduler server 108, which uses that information to create a program schedule that is broadcast in the overhead flow along with the voting overlay content. As an example of the voting server 110 coordinating with the scheduler server 108, the voting server 110 may send to the scheduler server 108 a list of selected candidate programs or content on which viewers will be permitted to vote so that the scheduler server 108 can determine a program schedule compatible with those candidates. The scheduling server 108 then may inform the voting server 110 of broadcast times so that the voting server 110 can determine appropriate vote casting periods. As an example of the voting server 110 receiving all schedule information from the scheduler server 108, the voting server 110 may receive schedules for vote casting periods from the scheduler server 108 and generate the voting overlay content and conduct the voting process in accordance with those received schedules.

Data flows to and from the voting server 110 may be enabled by a router server 112. In addition to routing communications among the various components and servers within the mobile TV broadcast network 102, the router server 112 may serve as an interface for receiving and routing messages from mobile devices 118 via the wireless data network 122. Mobile devices 118 send a variety of messages to the mobile TV broadcast network 102 via the wireless data network 122. For example, program service requests and pay-per-view purchase requests may be submitted via the wireless data network 122. Such transaction requests may be routed to a transaction server (not shown). In the various embodiments, the router server 112 may be programmed by software instructions to determine where an incoming message relates to voting and route such messages to the voting server 110. Alternatively, the voting server 110 may be configured by software instructions to function as a router or the voting server functionality may be implemented within a server that also functions as a router. Routers and their functionality are well known and their use is routine in the industry.

Figure 2:
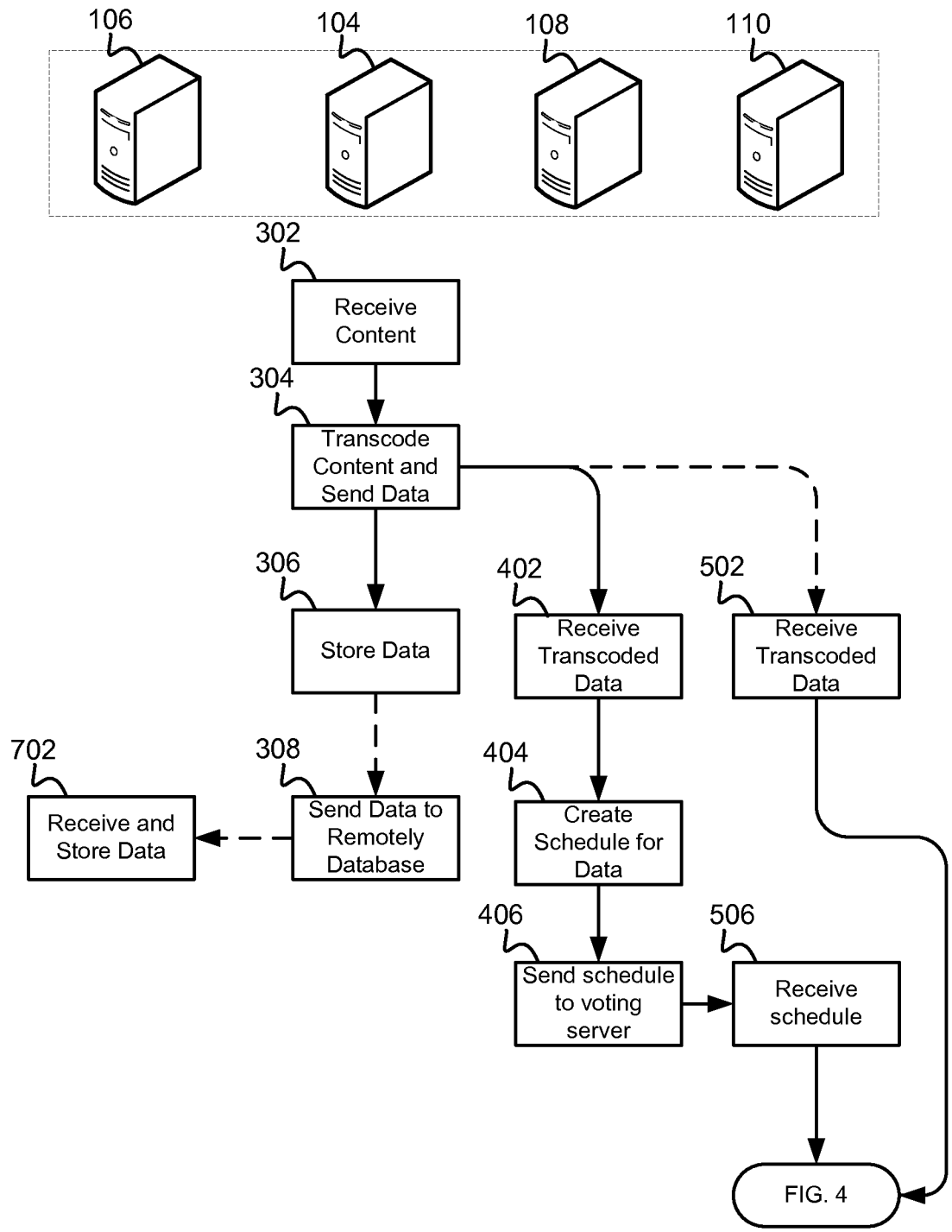
FIG. 2 is a process flow diagram of an embodiment method for receiving media content at a transcoder and providing information about programs or content to a voting server.
Figure 3:
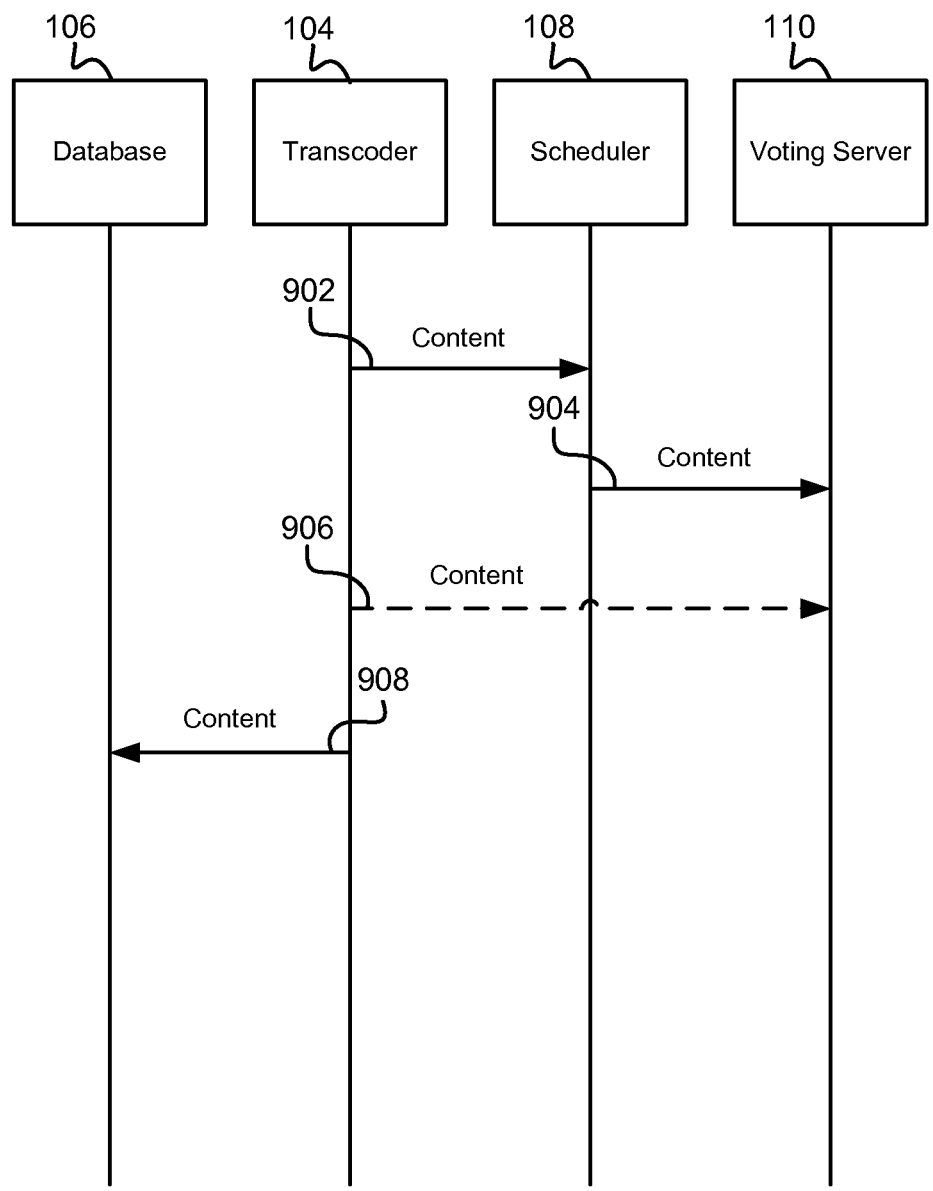
FIG. 3 is a message flow diagram of messages that may be exchanged in the embodiment method illustrated in FIG. 2.

FIG. 2 is a process flow diagram of an embodiment method for receiving programs at the transcoder 104 and sending information about transcoded programs to the voting server 110. FIG. 3 is a message flow diagram of messages which may be exchanged between different mobile broadcast TV system components according to the method shown in FIG. 3. This embodiment is described below with reference to both FIGS. 2 and 3.

As discussed above, programs and content from content providers 100 may be received by the mobile TV broadcast network provider 102 in the transcoder 104 from a receiver decoder 103, step 302. Incoming programs and content may be transcoded into a format suitable for broadcast, step 304. The resulting transcoded data may be stored internally, step 306, or stored in a content database 106, steps 308 and 702, message 908. The transcoder 104 may also obtain information about the received content (i.e., metadata such as title, subject matter, run time, etc.) and provide this metadata to the scheduler server 108, step 304, message 902. The scheduler server 108 may receive the content metadata, step 402, and use it to create a schedule for content to be broadcast and generate a program guide based on that schedule to be broadcast to mobile devices 118, step 404. The generated program guide is sent to the broadcaster 108 for broadcast via an overhead flow within broadcast transmissions (step not shown). The scheduler server 108 may also send schedule data to the voting server 110, such as schedule times during which viewer participation programming may be provided, step 406. As part of this step, the scheduler server 108 may also provide content metadata related to programs or content that are suitable for viewer participation programming. The voting server 110 may receive the schedule data, step 506, and process the information as part of creating voting overlay content as described in more detail below with reference to FIG. 4. Optionally, transcoder 104 may send the content metadata to the voting server 110 as part of step 304, optional message 906. The voting server may receive the content metadata from the transcoder 104, optional step 502, and use the metadata as part of creating voting overlay content as described in more detail below with reference to FIG. 4.

Figure 4:
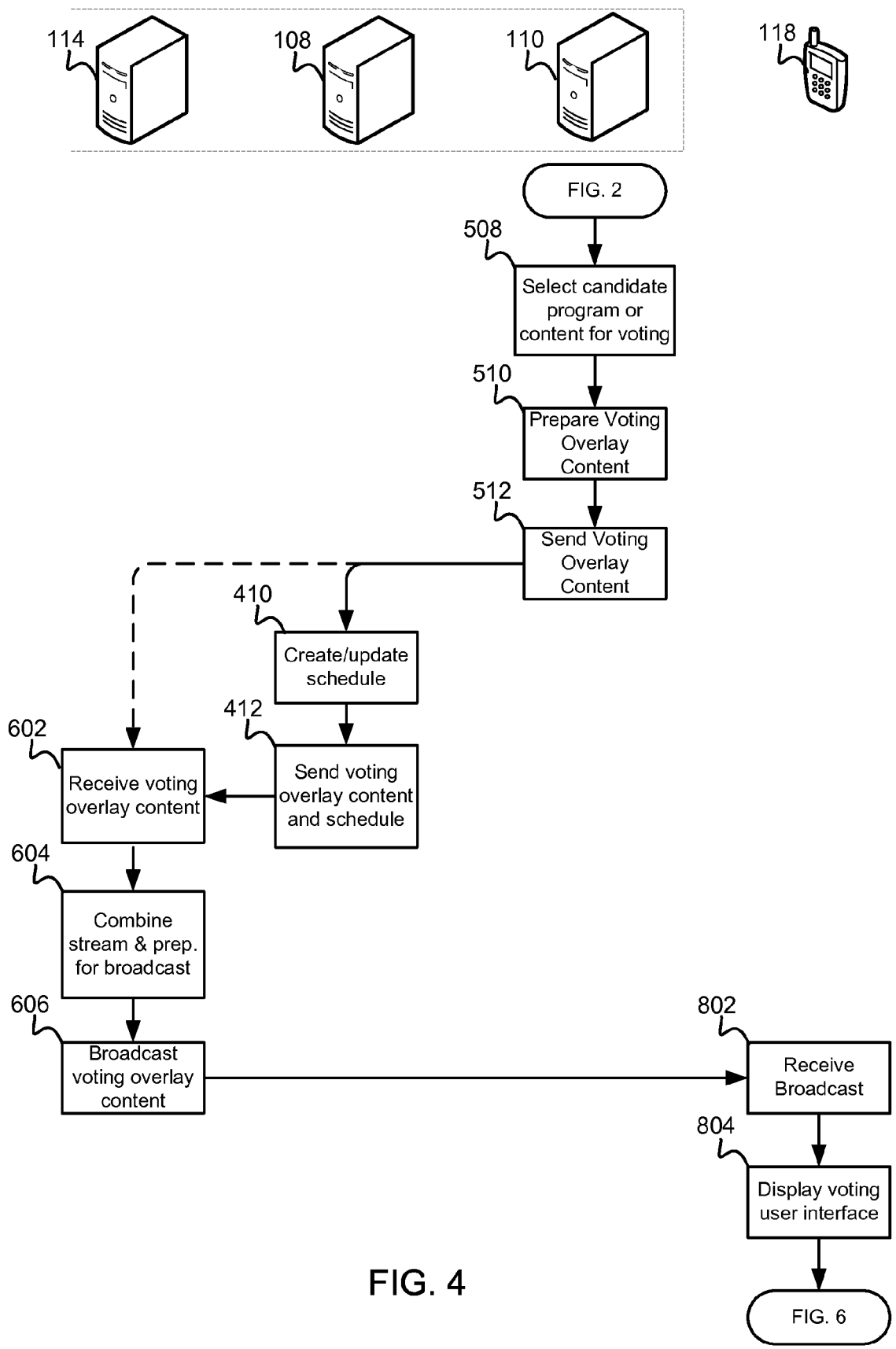
FIG. 4 is a process flow diagram of an embodiment method for creating and broadcasting voting overlay content messages to mobile devices.
Figure 5:
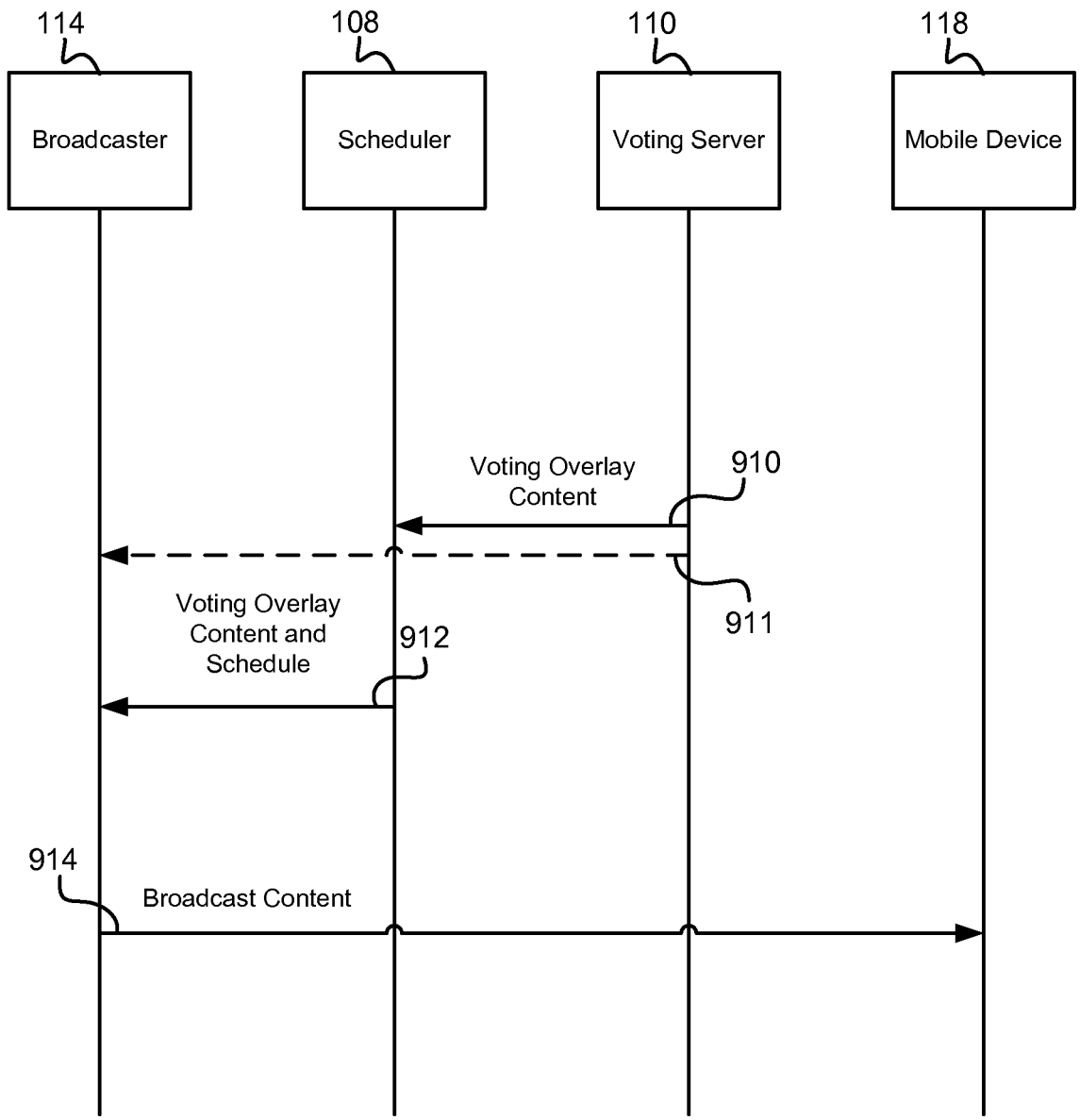
FIG. 5 is a message flow diagram of messages that may be exchanged in the embodiment method illustrated in FIG. 4.

FIG. 4 is a process flow diagram of an embodiment method for creating and broadcasting voting overlay content that mobile devices 118 can use to generate a user interface to enable viewers to vote for candidate programs or content. FIG. 5 is a message flow diagram of messages which may be exchanged between different mobile broadcast TV system components for creating and broadcasting voting overlay content according to the method shown in FIG. 4. This embodiment is described below with reference to both FIGS. 4 and 5.

As shown in FIGS. 4 and 5, the voting server 110 may use the schedule data received from the scheduler server 108 and content metadata received from scheduler server 108 and/or transcoder 104 to select a list of programs or content that will be offered to viewers in the vote casting process as candidate programs or content, step 508. This step may involve using the metadata content to sort through content alternatives to select programs and content that run within compatible time slots, belong to a common genre, or otherwise are suitable for being offered to viewers as candidate programs or content. This step may also involve accessing content metadata for programs or content stored in a content database 106. This step may further involve organizing selected candidate programs or content into separate election groups that will be presented to viewers in sequential vote casting sessions. This step may involve coordinating and scheduling of selected contents broadcast times with the scheduler server 108, such as to comply with a program time slot allocated to viewer participation programming. For example, the voting server 110 might sort through content metadata for 100 music videos to select 30 candidate videos to present to viewers for voting during a music video viewer participation time slot. The voting server 110 may then organize those 30 candidate music videos into six groups of five candidate videos each that will be presented to viewers in six separate music video voting sessions during the viewer participation time slot. In organizing the groups of candidate videos, the voting server 110 may group videos based upon their duration so that any one of the five candidate videos may be selected for broadcast without varying the time slot for a particular group.

Using the generated list of candidate programs or content and associated content metadata (e.g., title, artist or actor, year, genre, duration, etc.), the voting server 110 may generate the appropriate voting overlay content for broadcast to mobile devices 118, step 510. As described above, the voting overlay content may include data that can be used by a client application in mobile devices 118 to display the candidate programs or content to the viewer. The voting overlay content may include more information than just the program or content title, such as the artists or actors, year of production or composition, writer or composer, parental rating, critic evaluations, thumbnail images, or any other information that may help viewers make an informed decision. The voting overlay content may be generated in a format that a client application on mobile devices can interpret and use to generate a voting overlay display and populate a voting user interface. In one embodiment, the voting overlay content may be raw information that the client application can organize into a display. In another embodiment, the voting overlay content may in the form of a hypertext language script, such as XML or HTML, which a client application implements in order to generate a voting overlay display.

When the voting server 110 has created the voting overlay content, it may send it to the scheduler 108, step 512, message 910. The scheduler 108 may use the voting overlay content information to create or update program schedule data associated with the viewer participation programming, step 410, and send the voting overlay content along with the updated program schedule data to the broadcaster 114, step 412, message 912. The program schedule data created by the scheduler server 108 in this step may also include data to enable the broadcaster 114 to determine particular programs or content that should be obtained for broadcast at particular times. Alternatively or in addition, the voting server 110 may provide the voting overlay content directly to the broadcaster 114, (as shown in the dashed arrow), message 911. Providing the voting overlay content directly to the broadcaster 114 enables immediate broadcast of this information in the overhead portions of the broadcast transmissions.

The broadcaster 114 may receive the voting overlay content as well as any updated program schedule data, step 602, and combine these messages with broadcast streams into a multiplex to signal suitable for broadcast, step 604. This multiplex to signal is then transmitted to the broadcast sites 116 where it is broadcast to mobile devices 118, step 606, message 914. Broadcast of the voting overlay content may employ the same methods as currently used for broadcasting other types of overhead information, such as the program guide information.

Mobile devices 118 receive the voting overlay content along with other overhead information broadcast in the overhead portions of broadcast transmissions, step 802. A client application running on a processor within the mobile device 118 may parse the voting overlay content to obtain information regarding candidate programs or content, and uses the information to generate a display as part of a voting user interface, step 804. An example display format suitable for generating the voting user interface is described below with reference to FIG. 12A-12E.

Figure 6:
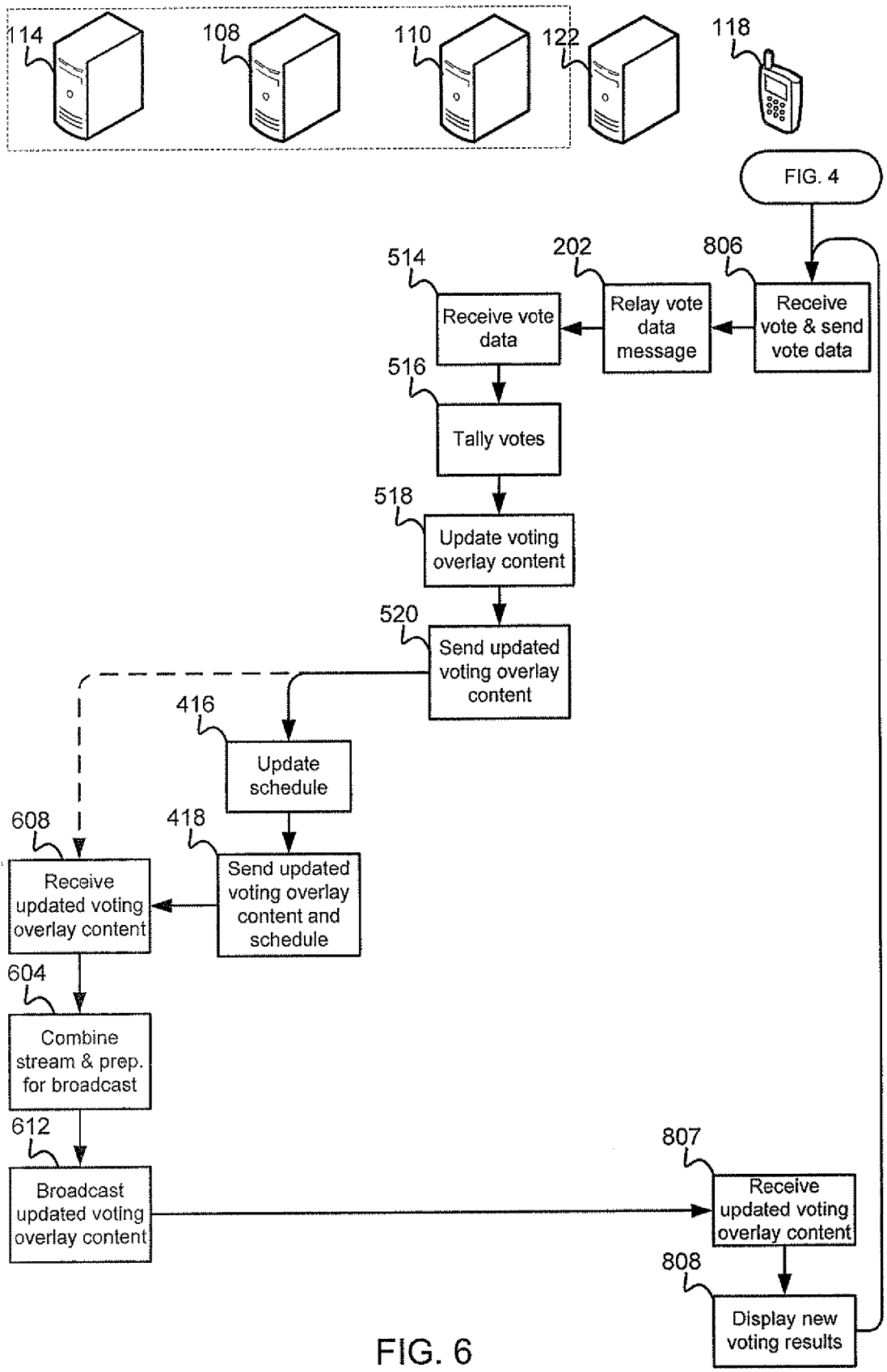
FIG. 6 is a process flow diagram of an embodiment method for receiving votes cast and broadcasting updated voting overlay contents to mobile devices.
Figure 7:
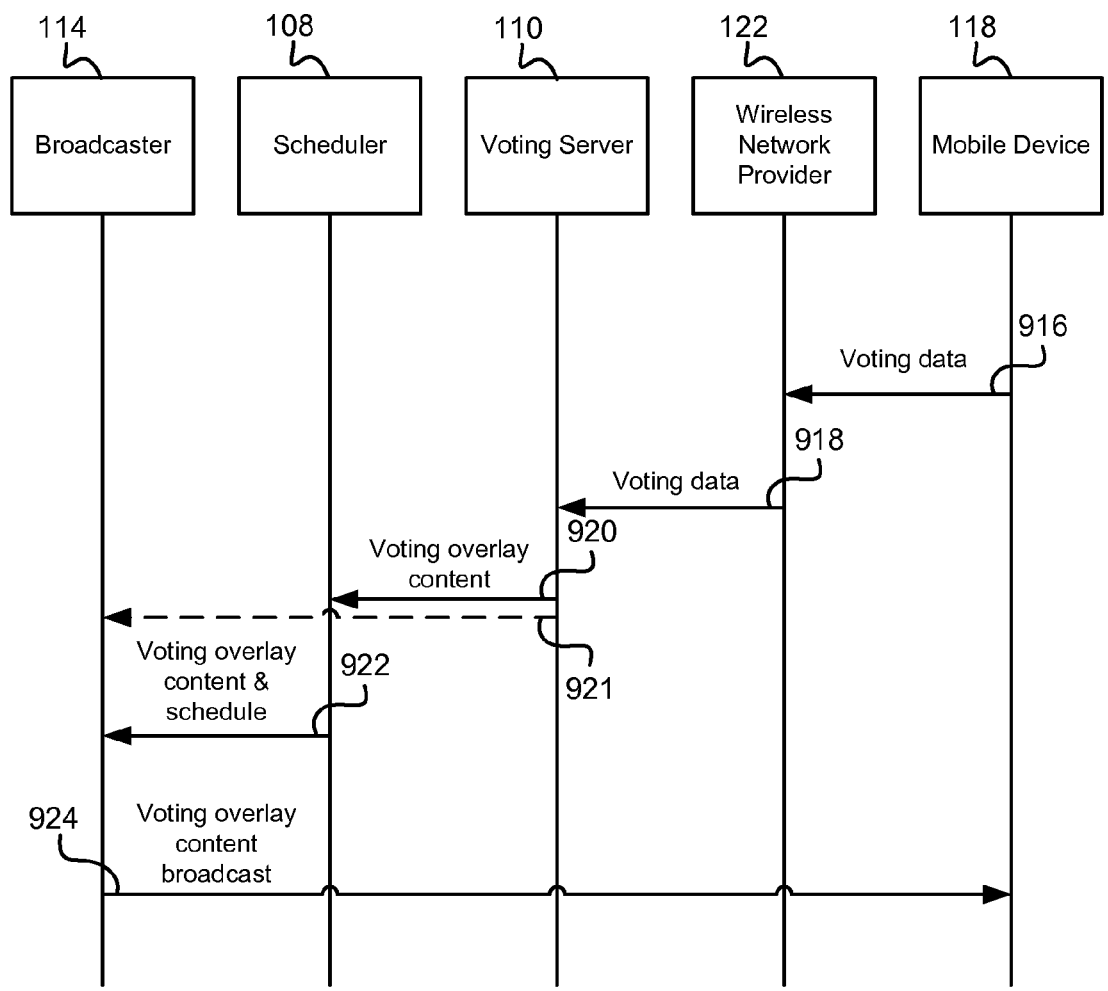
FIG. 7 is a message flow diagram of messages that may be exchanged in the embodiment method illustrated in FIG. 6.

FIG. 6 is a process flow diagram of an embodiment method for receiving votes cast by viewers, updating the voting overlay content to incorporate vote tallies and broadcasting updated voting overlay content to mobile devices. FIG. 7 is a message flow diagram of messages which may be exchanged between different mobile broadcast TV system components in the method shown in FIG. 6. This embodiment is described below with reference to both FIGS. 6 and 7.

As shown in FIGS. 6 and 7, when the voting overlay content information is presented on mobile devices in a voting user interface, viewers may use their mobile devices 118 to indicate their preference or vote for a preferred candidate program or content. The client application operating on the mobile devices 118 may be configured to receive a viewer's response to the voting user interface, and use that input to generate a voting data message that is sent to the mobile TV broadcast network 102 using a unicast network, step 806, message 916. The voting data message sent from the mobile device 118 may be forwarded by a wireless data communication network 122 to the mobile TV broadcast network 102, step 202, message 918. The voting data message received by the mobile TV broadcast network 102 may be routed to the voting server 110, step 514. As each voting data message is received, the voting server 110 may tally the votes against the candidate programs or content, step 516. In an embodiment, the voting server 110 may periodically update the voting overlay content to reflect interim vote tallies, step 518. The updated voting overlay content may be sent to the scheduler 108 or to the broadcaster 114, step 520, messages 920 and 921. The scheduler 108 may use the updated voting overlay content information to update program schedule data, step 416, and send the updated voting overlay content and updated schedule data to the broadcaster 114, step 418, message 922. The broadcaster 114 may receive the updated voting overlay content and schedule data, step 608. The broadcaster 114 may combine these messages with broadcast streams into a multiplex to signal suitable for broadcast, step 604, and broadcast the updated voting overlay content to mobile devices 118, step 612, message 924.

Mobile devices 118 may receive the broadcasted updated voting overlay content, step 807, and update the voting user interface display to reflect the interim voting results, step 808. Viewers may use the voting user interface to again indicate their preference or vote for a candidate program or content, such as to switch their vote to a preferred one of the more popular candidates, which the client application may receive, thereby repeating the process by returning to step 806.

Figure 8:
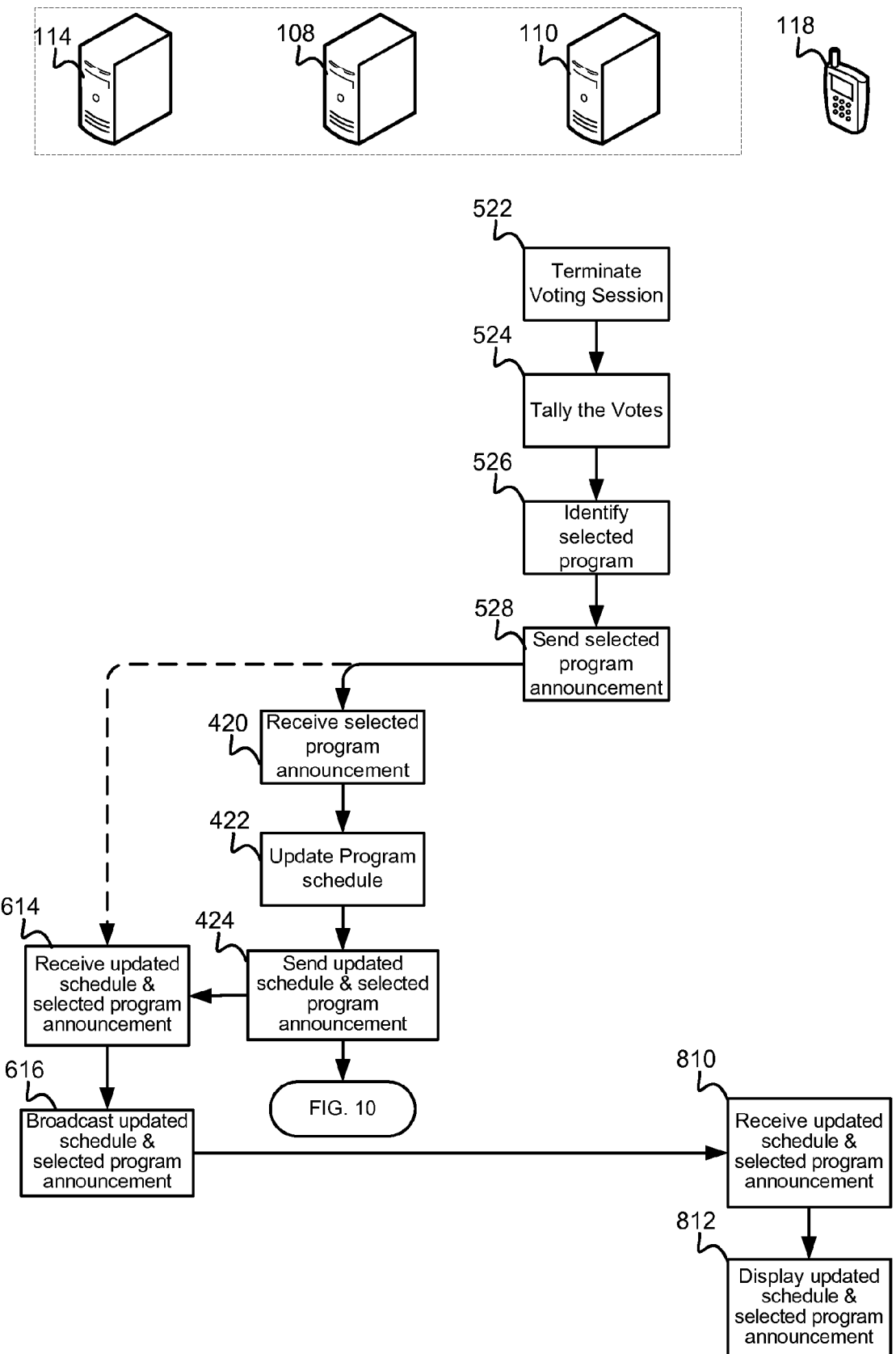
FIG. 8 is a process flow diagram of an embodiment method for terminating a voting session and broadcasting selected program results to mobile devices.
Figure 9:
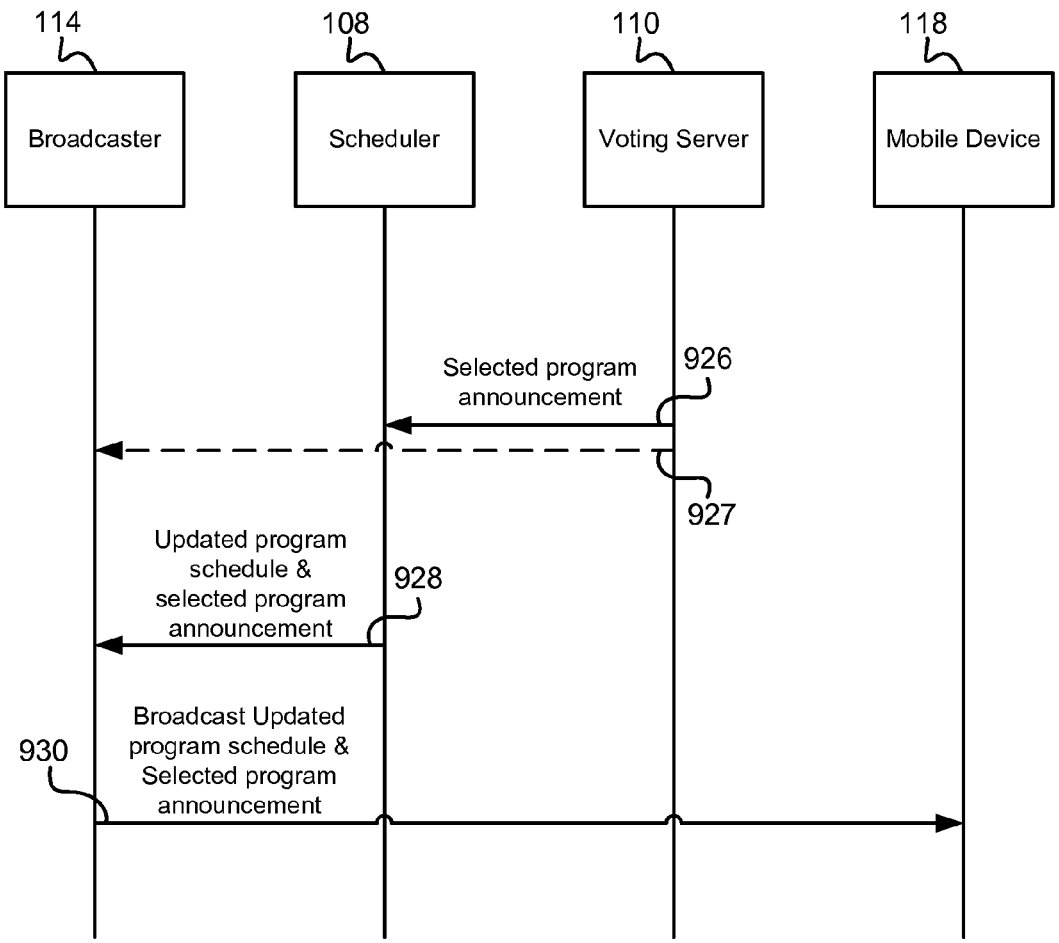
FIG. 9 is a message flow diagram of messages that may be exchanged in the embodiment method illustrated in FIG. 8.

The processes illustrated in FIG. 6 may be repeated continuously until a vote casting period ends, at which point a most popular program or content may be selected for broadcast. FIG. 8 illustrates an embodiment method for terminating the voting session and identifying and sending the selected program results to the viewers. FIG. 9 is a message flow diagram of messages which may be exchanged between different mobile broadcast TV system components for terminating the voting session and sending the selected program results to the viewers' mobile devices according to the method shown in FIG. 8. This embodiment is described below with reference to both FIGS. 8 and 9.

As shown in FIGS. 8 and 9, at a designated time the voting server 110 may terminate a voting session such as by ceasing to receive additional voting data messages from mobile devices, step 522, so that a most popular program or content may be selected. When the voting session is terminated, the voting server 110 may tally the votes, step 524, and identify a most popular program or content that is selected for broadcast, step 526. Information regarding the selected program or content may be sent to the scheduler server 108, step 528, message 926. The scheduler server 108 may receive the selected program results, step 420, and create an updated program schedule to inform mobile devices of the selected program or content as well as its designated broadcast time, step 422. The updated program schedule may be provided to the broadcaster 114, step 424, message 928. The broadcaster 114 may receive the updated program schedule along with the selected program announcement, step 614, and broadcast this information in the overhead portion of the broadcast transmission, step 616, message 930.

Optionally, the voting server 110 may send the selected program announcement directly to the broadcaster 114, step 528, message 927 (as shown in dashed to arrows). This selected program announcement may be in the form of an updated voting content overlay that the broadcaster 114 can broadcast in the overhead portion of the broadcast transmission, step 616, on message 930.

Mobile devices 118 may receive the updated program schedule and selected program announcement, step 810. The client application operating within the mobile devices may then use the received information to generate a display informing viewers of the program or content selected for broadcast based on their voting, step 812. The mobile devices 118 may also use the updated program schedule to update a display of content that will be broadcast as typical of conventional program guides.

Figure 10:
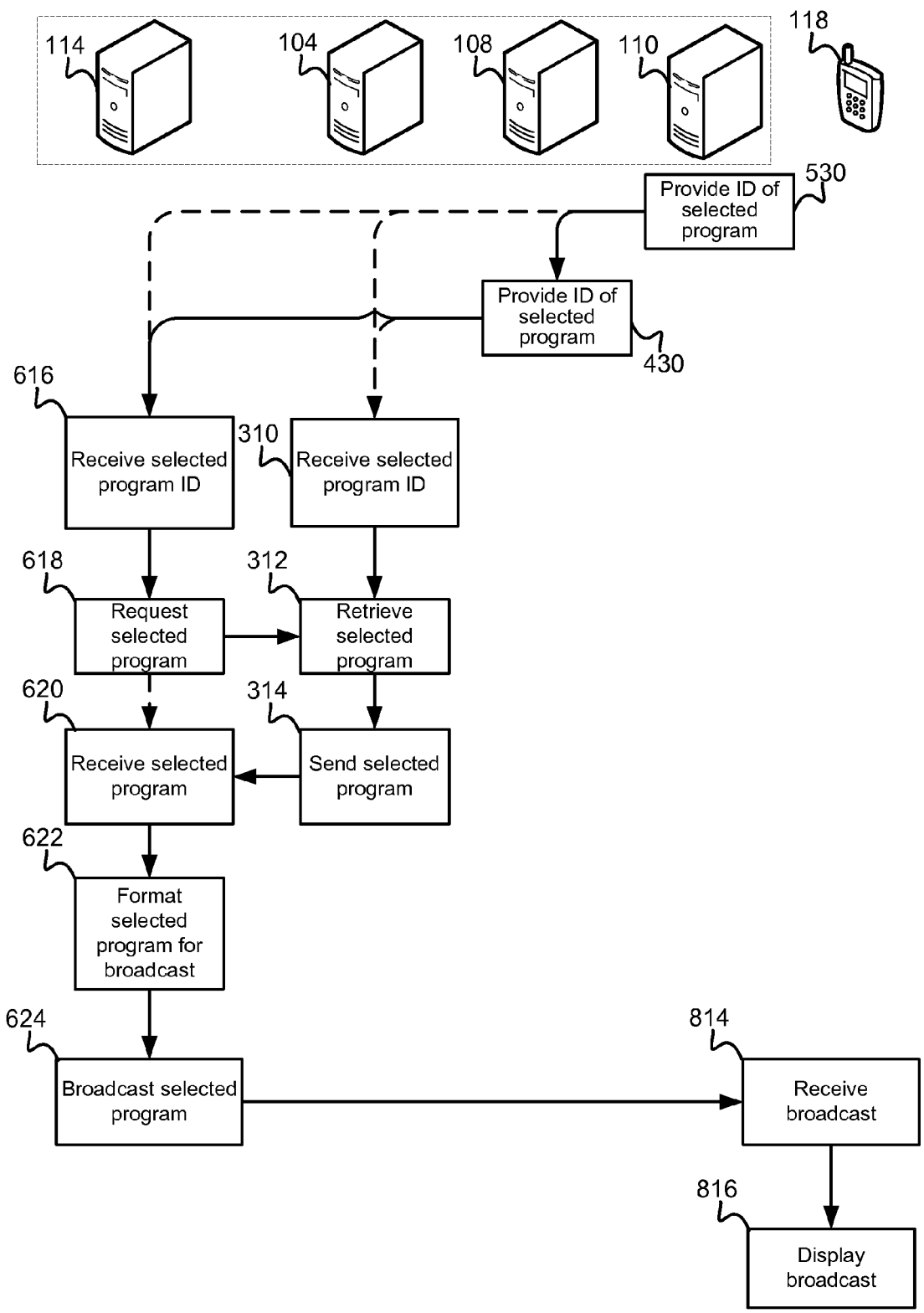
FIG. 10 is a process flow diagram of an embodiment method for broadcasting a selected program to mobile devices.
Figure 11:
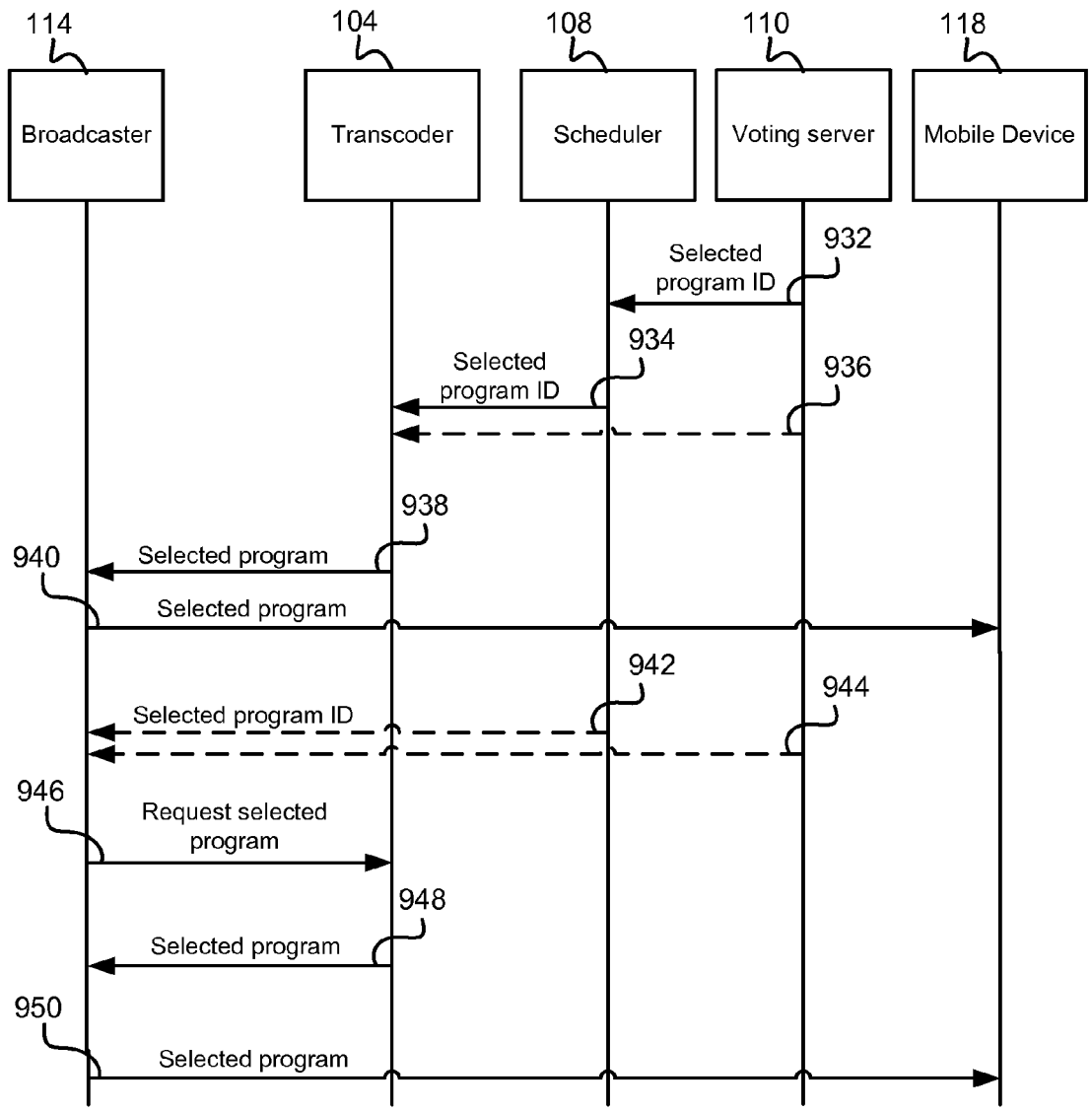
FIG. 11 is a message flow diagram of messages that may be exchanged in the embodiment method illustrated in FIG. 10.

When a program or content is selected for broadcast based upon viewer voting, the mobile TV broadcast network provider 102 may retrieve the selected program or content from storage (e.g., content database 106), insert the selected program or content into the broadcast queue, and then broadcast the selected program or content at a prescribed time FIG. 10 is a process flow diagram of an embodiment method for retrieving the selected program from the storage and broadcasting it to the viewers. FIG. 11 is a message flow diagram of messages which may be exchanged between different mobile broadcast TV system components for retrieving and broadcasting the selected program according to the method shown in FIG. 10. This embodiment is described below with reference to both FIGS. 10 and 11.

As shown in FIGS. 10 and 11, when a program or content has been selected for broadcast information regarding the selected program or content may be provided to components within the mobile TV broadcast network 102 to enable the selected program to be prepared for broadcast. As mentioned above, a program or content selected for broadcast may be identified by a memory address or other program identifier (ID) usable by the mobile TV broadcast network components. Using such a program identifier, network components such as the broadcaster 114 or transcoder 104 may retrieve the selected program or content from memory (e.g., a content database 106), and prepare it for broadcast. When it has selected a program or content based upon voting results, the voting server 110 may provide the selected program ID to the scheduler server 108, broadcaster 114 or the transcoder 104, step 530.

If the voting server 110 provides the selected program ID to the scheduler server 108, step 530, message 932, the scheduler server 108 may provide the selected program ID to other network components, such as the broadcaster 114 or transcoder 104 as part of its program scheduling functions. In an example embodiment, the scheduler server 108 may provide the selected program ID to the transcoder 104, step 430, message 934. The transcoder may receive the selected program ID, step 310, and use that information to retrieve the selected program from memory, step 312. As mentioned above, the selected program or content may be retrieved from internal memory of the transcoder 104 or from a content database 106. The transcoder 104 may then send the retrieve selected program or content to the broadcaster 114 in a manner similar to that of a program feed of transcoded content received from a content provider, step 314, message 938. The broadcaster 114 may receive the selected program, step 620, format the selected program for broadcast, step 622, and broadcast the selected program or content broadcast, step 624, message 940.

In another example embodiment, the scheduler server 108 may provide the selected program ID to the broadcaster 114, step 430, message 942. The broadcaster 114 may receive the selected program ID, step 616, and request the selected program to be provided from memory, step 618. The broadcaster 114 may request the selected program from the transcoder 104 or directly from a content database 106. If the broadcaster 114 requests the selected program from the transcoder 104, it may include the selected program ID with that request, step 618, message 946. The transcoder may receive the selected program ID, step 310, and use that information to retrieve the selected program or content from memory, step 312. As mentioned above, the selected program or content may be retrieved from internal memory of the transcoder 104 or from a content database 106. The transcoder 104 may then send the retrieved selected program or content to the broadcaster 114 in a manner similar to that of a program feed of transcoded content received from a content provider, step 314, message 938. If the broadcaster 114 requests or retrieves the selected program or content directly from a content database 106, such as by using the selected program ID to retrieve the content from memory, the broadcaster 114 may receive the selected program or content data as a data stream. The broadcaster 114 may receive the selected program (from the transcoder 104 or from a content database 106), step 620, format the selected program for broadcast, step 622, and broadcast the selected program like any other program or content broadcast, step 624, message 940.

If the voting server 110 provides the selected program ID to the transcoder 104, step 530, message 936, the transcoder may receive the selected program ID, step 310, and use that information to retrieve the selected program from memory as described above, step 312. The transcoder 104 may then send the retrieve selected program or content to the broadcaster 114 in a manner similar to that of a program feed of transcoded content received from a content provider, step 314, message 938. The broadcaster 114 may receive the selected program, step 620, format the selected program for broadcast, step 622, and broadcast the selected program like any other program or content broadcast, step 624, message 940.

If the voting server 110 provides the selected program ID to the broadcaster 114, step 530, message 944, the broadcaster 114 may receive the selected program ID, step 616, and request the selected program to be provided from memory, step 618. As described above, the broadcaster 114 may request the selected program from the transcoder 104 or directly from a content database 106. If the broadcaster 114 requests the selected program from the transcoder 104, it may include the selected program ID with that request, step 618, message 946. The transcoder may receive the selected program ID, step 310, and use that information to retrieve the selected program or content from memory, step 312. As mentioned above, the selected program or content may be retrieved from internal memory of the transcoder 104 or from a content database 106. The transcoder 104 may then send the retrieve selected program or content to the broadcaster 114 in a manner similar to that of a program feed of transcoded content received from a content provider, step 314, message 938. If the broadcaster 114 requests or retrieves the selected program or content directly from a content database 106, such as by using the selected program ID to retrieve the content from memory, the broadcaster 114 may receive the selected program or content data as a data stream. The broadcaster 114 may receive the selected program (from the transcoder 104 or from a content database 106), step 620, format the selected program for broadcast, step 622, and broadcast the selected program like any other program or content broadcast, step 624, message 940.

When the selected program or content is broadcast, mobile devices may receive such broadcasts, step 814, and the code and display such broadcasts in the manner as ordinary mobile TV broadcasts, step 816.

Figure 12A:
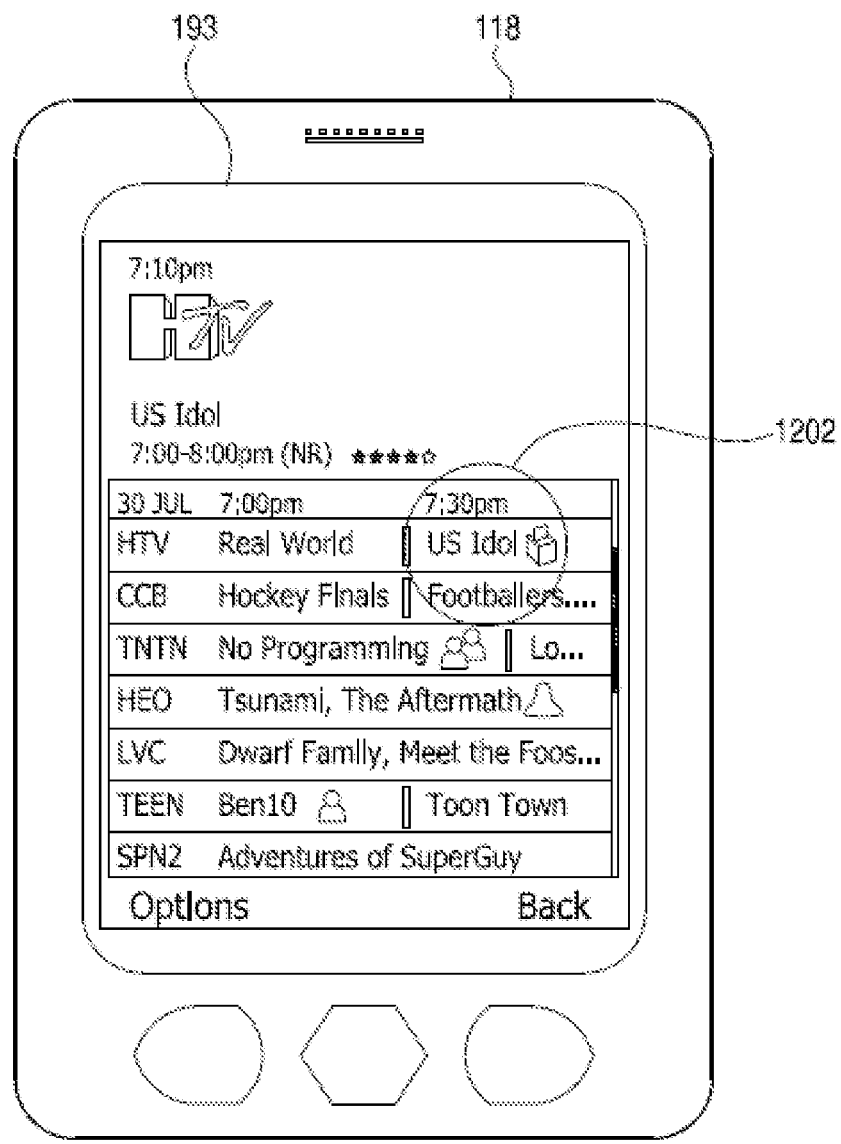

FIGS. 12A-12E illustrate a voting user interface according to an example embodiment using which may be implemented by a client application on mobile devices to enable viewers to see a list of the candidate programs or content, and indicate a preference or vote for a particular program or content. As shown in FIG. 12A, a mobile device 118, may include a display 193 on which the client application may display a list of mobile TV programs that are available to the mobile device user. For example, FIG. 12A illustrates a program guide listing 1200 that identifies programs available on various channels or flows at particular times In the illustrated example, the program "US Idol" 1202 is identified with a voting icon indicating that during viewing of this broadcast program the viewer may affect the programming by casting votes. The program guide interface may incorporate well known navigation tools or methods to enable viewers to select a program for viewing, such as the US Idol program 1202. When a viewer selects a program featuring viewer participation, such as the US Idol program 1202, the voting user interface may highlight the selected program on the mobile device display 193 to help the viewer confirm a selection.

Figure 12B:
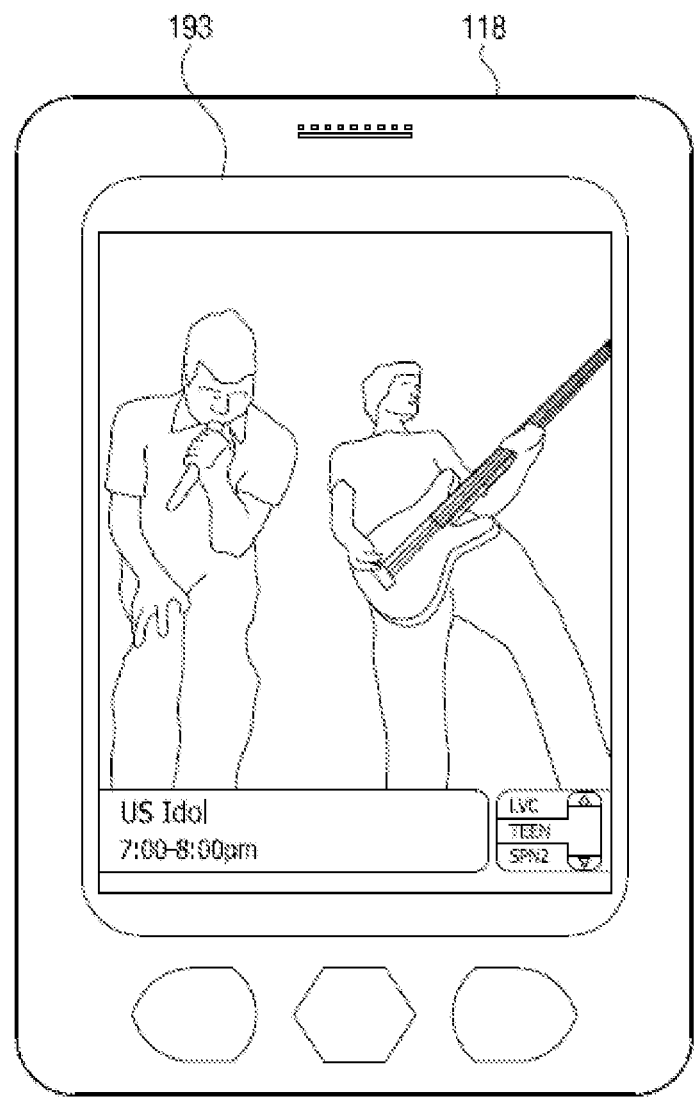
Figure 12D:
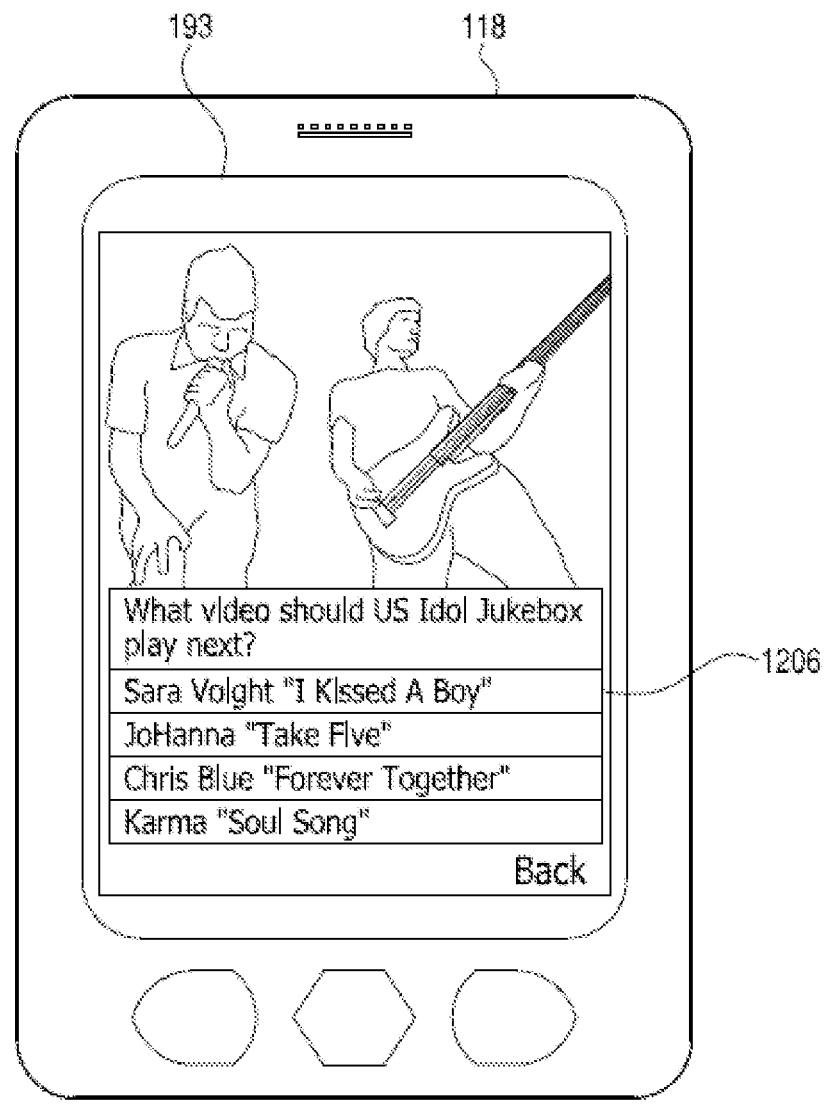

When a viewer selects a program, the program guide user interface may present the viewer with another user interface page, such as shown in FIG. 12B, to enable a viewer to confirm a desire to view the broadcast of the indicated program, such as "US Idol." Selecting a program that includes viewer participation (i.e., voting), may activate the voting user interface which may present the viewer with navigation features such as a menu soft-key for beginning a voting session. As shown in FIG. 12C, a menu may include several options, such as a voting option 1204, chat option, friends option, and facebook option. Selecting the voting menu option 1204 may cause the voting user interface to generate a voting menu overlay display 1206 based upon information in the voting overlay content, as shown in FIG. 12D. The voting menu overlay display 1206 may be displayed as part of the screen, such as at the bottom half of the display 193. Other orientations of the voting menu overlay display 1206 may be implemented. The voting menu overlay display 1206 may include instructions and a list of programs or content for which viewers may vote. For example, as shown in FIG. 12D, viewers may select a preferred program or content by touching the listing on a touch screen display. The client application on the mobile device 118 receives the touch screen touch event, interprets the event as a vote for a particular program or content, generates a voting data message, and sends the message to the mobile TV broadcast network 102 as described above. As part of this process, the selected program may be highlighted (not shown) to allow the viewer to ensure the correct selection of their favorite program.

Figure 12E:
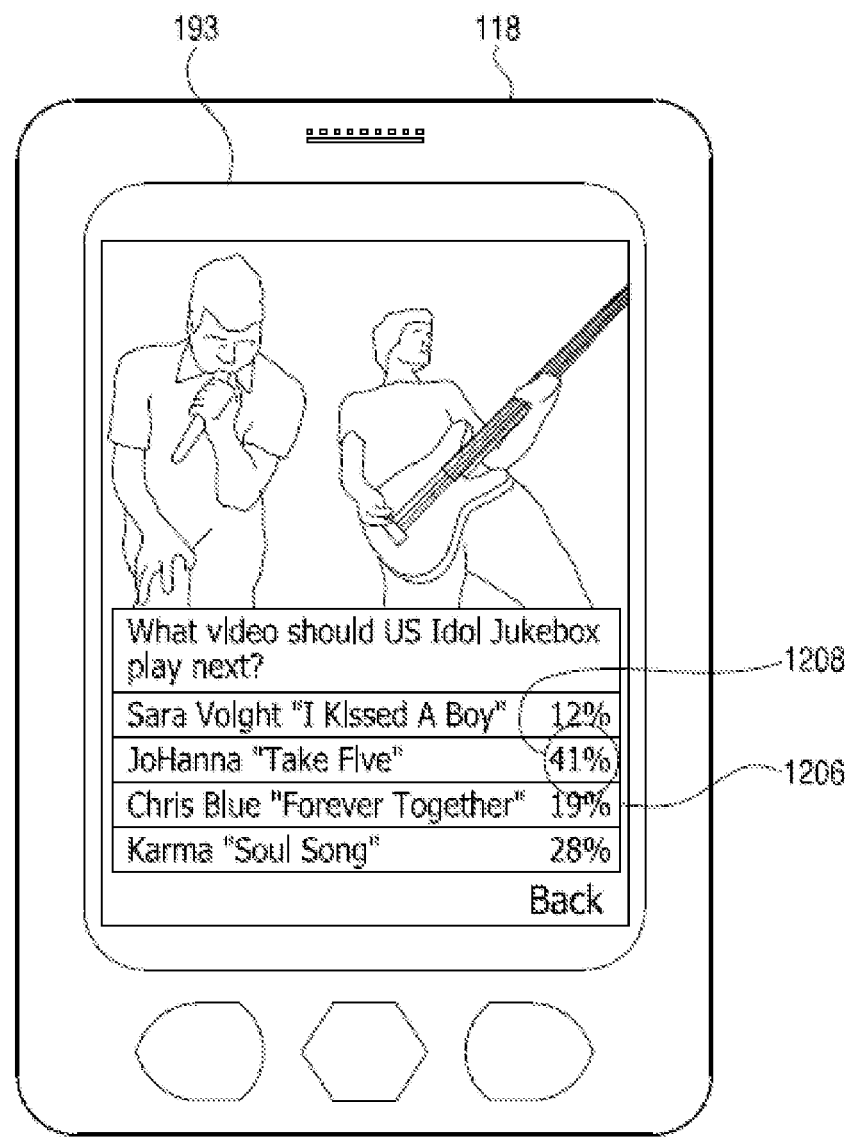

In addition to providing a list of programs, the voting menu overlay display 1206 may present vote tallies for listed programs or content. For example, vote tally results may be displayed in percent values to indicate their relative popularity. When the voting period ends, the voting menu overlay display 1206 may inform the viewer of the voter-selected program or content. For example, FIG. 12E illustrates the voting menu overlay display 1206 shows a program selection including voting percentage results 1208 for every listed program. Once it has been selected by voters, the selected program may begin to be received and displayed and a new voting session begun to select the next video.

The various embodiments may be used with a variety of programs and content. In addition to music video programming mentioned in the foregoing examples, the methods may be used to enable viewers to participate in selecting other types of videos, television episodes, movies, television programming, program categories (e.g., news, entertainment, sports, etc.) for particular timeslots, music, documentary topics, and other multimedia content. Additionally viewer input may be obtained using the various embodiments to schedule predetermined programming, such as selecting timeslots for particular programs, for example. In addition to selecting program content to be broadcast, the embodiment methods and systems may also be used to gather viewer inputs for other purposes, such as polling voters, obtaining community feedback on topics of general interest, selecting athletes, entertainers, or community leaders for popularity awards, enabling viewer participation in entertainment competition programs (e.g., American Idol®), and conducting any of a variety of surveys of the general public. In such non-programming applications, the voting server functionality may be substantially the same as described above and voting overlay content broadcasts may be used for presenting survey response options to viewers, as well as for communicating survey results. Since the voting or survey process is accomplished using the overhead portion of broadcast transmissions, the vote casting process can be implemented without degraded the mobile TV user experience of non-participating viewers.

Figure 13:
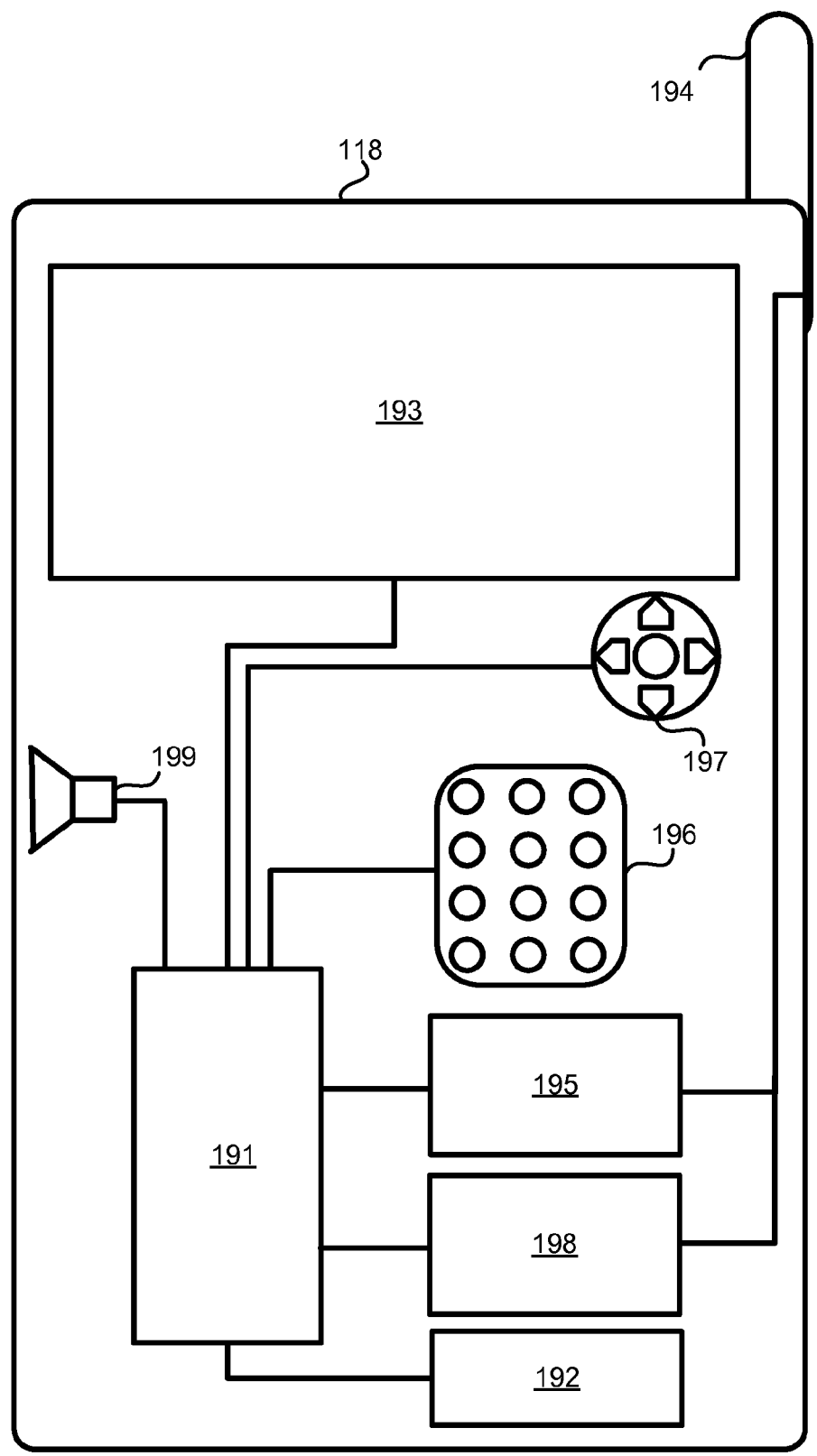
FIG. 13 is a component block diagram of a mobile device suitable for use in the various embodiments.

Typical mobile devices 118 suitable for use with the various embodiments will have in common the components illustrated in FIG. 13. For example, an exemplary mobile device 118 may include a processor 191 coupled to internal memory 192, a display 193, and to a speaker 199. Additionally, the mobile device 118 may have an antenna 194 for sending and receiving electromagnetic radiation that is connected to a wireless data link and/or cellular telephone transceiver 195 coupled to the processor 191 and a mobile TV broadcast receiver 198 coupled to the processor 191. Mobile devices typically also include one or more user input elements for receiving user inputs and providing the inputs to the processor 191, such as a touch-screen display 193, a key pad 196 or miniature keyboard, and/or menu selection buttons or rocker switches 197.

The processor 191 may be any programmable microprocessor, microcomputer or multiple processor chip or chips that can be configured by software instructions (applications) to perform a variety of functions, including the functions of the various embodiments described herein. In some mobile devices, multiple processors 191 may be provided, such as one processor dedicated to wireless communication functions and one processor dedicated to running other applications. Typically, software applications may be stored in the internal memory 192 before they are accessed and loaded into the processor 191. In some mobile devices, the processor 191 may include internal memory sufficient to store the application software instructions. The mobile device 118 may also include a separate memory chip 190, such as a smart card for storing information related to credits, token and coupons as in an electronic purse, according to the various embodiments. In some mobile devices, the secure memory may be in a separate memory chip coupled to the processor 191. In many mobile devices 118, the internal memory 192 may be a volatile or nonvolatile memory, such as flash memory, or a mixture of both. For the purposes of this description, a general reference to memory refers to all memory accessible by the processor 191, including internal memory 192, the memory chip 190, removable memory plugged into the mobile device, and memory within the processor 191 itself.

Figure 14:
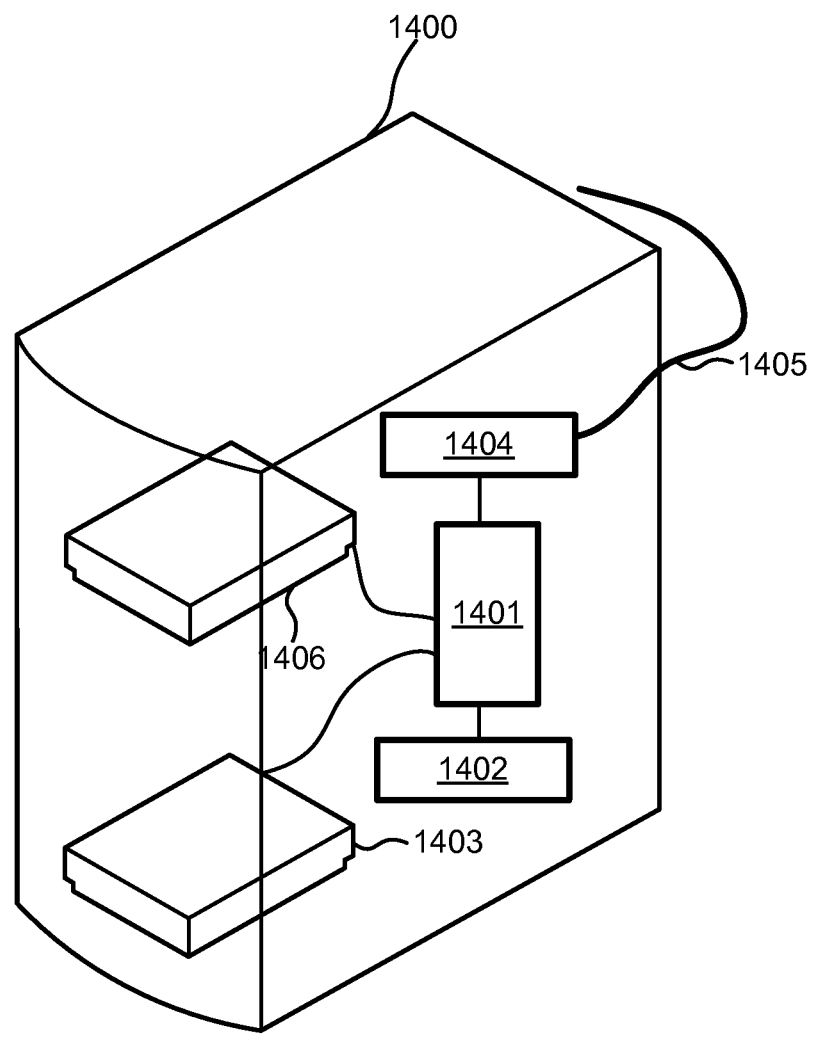
FIG. 14 is a component block diagram of a server device suitable for use in the various embodiments.

A number of the embodiments described above may also be implemented with any of a variety of remote server devices, such as the server 1400 illustrated in FIG. 14. Such a server 1400 typically includes a processor 1401 coupled to volatile memory 1402 and to a large capacity nonvolatile memory, such as a disk drive 1403. The server 1400 may also include a floppy disc drive and/or a compact disc (CD) drive 1406 coupled to the processor 1401. The server 1400 may also include network access ports 1404 coupled to the processor 1401 for establishing data connections with network circuits 1405, such as the Internet.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium. The steps of a method or algorithm disclosed herein may be embodied in a processor-executable software module executed which may reside on a non-transitory computer-readable medium. Computer-readable media includes computer storage media that facilitates transfer of a computer program from one place to another. A non-transitory storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a non-transitory machine readable medium and/or non-transitory computer-readable medium, which may be incorporated into a non-transitory computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for enabling viewer participation in mobile TV broadcast programming, comprising:
   broadcasting a voting overlay content in an overhead portion of broadcast transmissions, wherein the broadcast transmissions include at least one video channel, and the voting overlay content includes a list of candidate programs;
   receiving viewer input regarding the candidate programs via a unicast network, wherein the received viewer input comprises votes cast for particular candidate programs among the candidate programs;
   selecting a program from the candidate programs based upon a number of votes from the received viewer input indicating the program is a most popular program among all of the candidate programs; and
   broadcasting the selected program.

2. The method of claim 1, further comprising:
   tallying votes as viewer input is received;
   updating the voting overlay content to include interim vote tallies; and
   broadcasting the updated voting overlay content.

3. The method of claim 2, further comprising:
   receiving the broadcast voting overlay content on a mobile device;
   generating a display on the mobile device of the candidate programs using information obtained from the voting overlay content;
   receiving a user input on the mobile device related to the display of the candidate programs;
   generating a voting data message based upon the received user input;
   transmitting the voting data message to a mobile TV broadcast network via the unicast network;
   receiving the updated voting overlay content on the mobile device;
   generating an image on the display of the interim vote tallies for the candidate programs using information obtained from the updated voting overlay content;
   receiving a second user input on the mobile device related to the interim vote tallies;
   generating an updated voting data message based upon the received second user input; and
   transmitting the updated voting data message to the mobile TV broadcast network via the unicast network.

4. The method of claim 1, further comprising broadcasting a message announcing the selected program.

5. The method of claim 1, further comprising:
   scheduling a broadcast time for the selected program; and
   retrieving the selected program from a content database at the scheduled broadcast time.

6. The method of claim 1, further comprising:
   receiving the broadcast voting overlay content on a mobile device;
   generating a display on the mobile device of the candidate programs using information obtained from the voting overlay content;
   receiving a user input on the mobile device related to the display of the candidate programs;
   generating a voting data message based upon the received user input; and transmitting the voting data message to a mobile TV broadcast network via the unicast network.

7. The method of claim 6, wherein the unicast network is a cellular data communication network.

8. A server, comprising:
a server processor; and
a network interface coupled to the server processor and configured to connect the server processor to a network, wherein the server processor is configured with processor-executable instructions to perform operations comprising:
generating a voting overlay content including a list of candidate programs;
providing the voting overlay content to a mobile TV broadcaster for broadcast in an overhead portion of broadcast transmissions, wherein the broadcast transmissions include at least one video channel;
receiving viewer input regarding the candidate programs via a unicast network,
wherein the received viewer input comprises votes cast for particular candidate programs among the candidate programs;
selecting a program from the candidate programs based upon a number of votes from the received viewer input indicating the program is a most popular program among all of the candidate programs; and
causing the mobile TV broadcaster to broadcast the selected program.

9. The server of claim 8, wherein the server processor is configured with processor-executable instructions to perform operations further comprising:
tallying votes as viewer input is received;
updating the voting overlay content to include interim vote tallies; and
providing the updated voting overlay content to the mobile TV broadcaster for broadcast.

10. The server of claim 8, wherein the server processor is configured with processor-executable instructions to perform operations further comprising:
generating a message announcing the selected program; and
providing the message announcing the selected program to the mobile TV broadcaster for broadcast.

11. A mobile TV broadcast system, comprising:
a broadcaster configured to receive programs from a source of programs and configure the received programs for broadcast in mobile TV broadcast transmissions;
a routing server coupled to an external network and configured to receive messages from a unicast network; and
a voting server coupled to the broadcaster and to the routing server via a system network, the voting server comprising:
a processor; and
a network interface coupled to the processor and configured to connect the processor to the system network, wherein the processor is configured with processor-executable instructions to perform operations comprising:
generating a voting overlay content including a list of candidate programs;
providing the voting overlay content to the broadcaster for broadcast in an overhead portion of the mobile TV broadcast transmissions, wherein the mobile TV broadcast transmissions include at least one video channel;
receiving viewer input regarding the candidate programs from the routing server, wherein the received viewer input comprises votes cast for particular candidate programs among the candidate programs;
selecting a program from the candidate programs based upon a number of votes from the received viewer input indicating the program is a most popular program among all of the candidate programs; and
informing the broadcaster of the selected program for broadcast.

12. The mobile TV broadcast system of claim 11, wherein the voting server processor is configured with processor-executable instructions to perform operations further comprising:
tallying votes as viewer input is received;
updating the voting overlay content to include interim vote tallies; and
providing the updated voting overlay content to the broadcaster for broadcast.

13. The mobile TV broadcast system of claim 11, wherein the voting server processor is configured with processor-executable instructions to perform operations further comprising:
generating a message announcing the selected program; and
providing the message announcing the selected program to the broadcaster for broadcast.

14. The mobile TV broadcast system of claim 11, further comprising a content database coupled to the broadcaster, wherein:
the voting server is configured with processor-executable instructions to perform operations further comprising scheduling a broadcast time for the selected program; and
the broadcaster is further configured to retrieve the selected program from the content database at the scheduled broadcast time.

15. A mobile device, comprising:
a processor;
a mobile TV broadcast receiver coupled to the processor;
a unicast wireless network transceiver coupled to the processor;
a display coupled to the processor;
a user input element coupled to the processor; and
a memory coupled to the processor,
wherein the processor is configured with processor-executable instructions to perform operations comprising:
receiving voting overlay content from an overhead portion of mobile TV broadcast transmissions, wherein the mobile TV broadcast transmissions include at least one video channel and the voting overlay content includes a list of candidate broadcast programs;
generating an image on the display of candidate broadcast programs based on the list of candidate broadcast programs obtained from the voting overlay content;
receiving a user input from a user input element related to the image of the candidate broadcast programs, wherein the user input comprises a vote cast for a particular candidate broadcast program among the list of candidate broadcast programs;
generating a voting data message based upon the received user input; and
transmitting the voting data message for selecting a most popular candidate broadcast program among the list of candidate broadcast programs based on a number of votes to a mobile TV broadcast network via the unicast wireless network transceiver.

16. The mobile device of claim 15, wherein the unicast wireless network transceiver is a cellular data communication transceiver.

17. The mobile device of claim 15, wherein the processor is configured with processor-executable instructions to perform operations further comprising:
receiving updated voting overlay content from the overhead portion of mobile TV broadcast transmissions; and
generating an image on the display of interim vote tallies for the candidate broadcast programs using information obtained from the updated voting overlay content.

18. The mobile device of claim 17, wherein the processor is configured with processor-executable instructions to perform operations further comprising:
receiving a second user input related to the interim vote tallies;
generating an updated voting data message based upon the received second user input; and
transmitting the updated voting data message to the mobile TV broadcast network via the unicast wireless network transceiver.

19. A mobile TV broadcast system, comprising:
means for generating a voting overlay content including a list of candidate programs for broadcast;
means for broadcasting the voting overlay content in an overhead portion of mobile TV broadcast transmissions, wherein the mobile TV broadcast transmissions include at least one video channel;
means for receiving viewer input regarding the candidate programs from a unicast network, wherein the viewer input comprises a vote cast for a particular candidate program among the list of candidate programs;
means for selecting a program from the candidate programs based upon a number of votes from the received viewer input indicating the program is a most popular program among all of the candidate programs; and
means for broadcasting the selected program in mobile TV broadcast transmissions.

20. The mobile TV broadcast system of claim 19, wherein the system further comprises:
means for tallying votes as viewer input is received;
means for updating the voting overlay content to include interim vote tallies; and
means for broadcasting the updated voting overlay content in the overhead portion of mobile TV broadcast transmissions.

21. The mobile TV broadcast system of claim 19, further comprising:
means for generating a message announcing the selected program; and
means for broadcasting the message announcing the selected program in the overhead portion of mobile TV broadcast transmissions.

22. The mobile TV broadcast system of claim 19, further comprising:
means for scheduling a broadcast time for the selected program; and
means for retrieving the selected program from a content database at the scheduled broadcast time.

23. A mobile device, comprising:
means for receiving voting overlay content from an overhead portion of mobile TV broadcast transmissions, wherein the mobile TV broadcast transmissions include at least one video channel and the voting overlay content includes a list of candidate broadcast programs;
means for generating a display of candidate broadcast programs based on the list of candidate broadcast programs obtained from the voting overlay content;
means for receiving a user input from a user input element related to the display of the candidate broadcast programs wherein the user input comprises a vote cast for a particular candidate broadcast program among the list of candidate broadcast programs;
means for generating a voting data message based upon the received user input; and
means for transmitting the voting data message for selecting a most popular candidate broadcast program among the list of candidate broadcast programs based on a number of votes to a mobile TV broadcast network via a unicast wireless network.

24. The mobile device of claim 23, wherein means for transmitting the voting data message for selecting a most popular candidate broadcast program among the list of candidate broadcast programs based on a number of votes to a mobile TV broadcast network via the unicast wireless network comprises means for transmitting the voting data message for selecting a most popular candidate broadcast program among the list of candidate broadcast programs based on a number of votes to a mobile TV broadcast network via a cellular data communication transceiver.

25. The mobile device of claim 23, further comprising:
means for receiving updated voting overlay content from the overhead portion of mobile TV broadcast transmissions; and
means for generating a display of interim vote tallies for the candidate broadcast programs using information obtained from the updated voting overlay content.

26. The mobile device of claim 25, further comprising:
means for receiving a second user input related to the interim vote tallies;
means for generating an updated voting data message based upon the received second user input; and
means for transmitting the updated voting data message to the mobile TV broadcast network via the unicast wireless network.

27. A non-transitory server-readable storage medium having stored thereon processor-executable instructions configured to cause a server processor to perform operations comprising:
generating a voting overlay content including a list of candidate programs;
providing the voting overlay content to a mobile TV broadcaster for broadcast in an overhead portion of broadcast transmissions, wherein the broadcast transmissions include at least one video channel;
receiving viewer input regarding the candidate programs via a unicast network, wherein the received viewer input comprises votes cast for particular candidate programs among the candidate programs;
selecting a program from the candidate programs based upon a number of votes from the received viewer input indicating the program is a most popular program among all of the candidate programs; and
causing a mobile TV broadcaster to broadcast the selected program.

28. The non-transitory server-readable storage medium of claim 27, wherein the stored processor-executable instructions are configured to cause a server processor to perform operation further comprising:
tallying votes as viewer input is received;
updating the voting overlay content to include interim vote tallies; and providing the updated voting overlay content to the mobile TV broadcaster for broadcast.

29. The non-transitory server-readable storage medium of claim 27, wherein the stored processor-executable instructions are configured to cause a server processor to perform operations further comprising:
generating a message announcing the selected program; and
providing the message announcing the selected program to the mobile TV broadcaster for broadcast.

30. A non-transitory computer-readable storage medium having stored thereon processor-executable instructions configured to cause a mobile device processor to perform operations comprising:
receiving voting overlay content from an overhead portion of mobile TV broadcast transmissions, wherein the voting overlay content includes a list of candidate broadcast programs and the mobile TV broadcast transmissions include at least one video channel;
generating a display of candidate broadcast programs based on the list of candidate broadcast programs obtained from the voting overlay content;
receiving a user input from a user input element related to the display of the candidate broadcast programs, wherein the user input comprises a vote cast for a particular candidate broadcast program among the list of candidate broadcast programs;
generating a voting data message based upon the received user input; and
transmitting the voting data message for selecting a most popular candidate broadcast program among the list of candidate broadcast programs based on a number of votes to a mobile TV broadcast network via a unicast wireless network.

31. The non-transitory computer-readable storage medium of claim 30, wherein the stored processor-executable instructions are configured to cause a mobile device processor to perform operations such that transmitting the voting data message for selecting a most popular candidate broadcast program among the list of candidate broadcast programs based on a number of votes to a mobile TV broadcast network via a unicast wireless network comprises transmitting the voting data message for selecting a most popular candidate broadcast program among the list of candidate broadcast programs based on a number of votes to a mobile TV broadcast network via a cellular data communication network.

32. The non-transitory computer-readable storage medium of claim 30, wherein the stored processor-executable instructions are configured to cause a mobile device processor to perform operations further comprising:
receiving updated voting overlay content from the overhead portion of mobile TV broadcast transmissions; and
generating a display of interim vote tallies for the candidate broadcast programs using information obtained from the updated voting overlay content.

33. The non-transitory computer-readable storage medium of claim 32, wherein the stored processor-executable instructions are configured to cause a mobile device processor to perform operations further comprising:
receiving a second user input related to the interim vote tallies;
generating an updated voting data message based upon the received second user input; and
transmitting the updated voting data message to the mobile TV broadcast network via the unicast wireless network.

* * * * *